(12) United States Patent
Shuto et al.

(10) Patent No.: US 9,417,500 B2
(45) Date of Patent: Aug. 16, 2016

(54) DISPLAY UNIT AND ELECTRONIC APPARATUS

(71) Applicant: Sony Corporation, Tokyo (JP)

(72) Inventors: Aya Shuto, Kanagawa (JP); Ken Kobayashi, Kanagawa (JP); Yuriko Kaino, Kanagawa (JP); Ryo Kasegawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 48 days.

(21) Appl. No.: 14/222,120

(22) Filed: Mar. 21, 2014

(65) Prior Publication Data

US 2014/0293401 A1    Oct. 2, 2014

(30) Foreign Application Priority Data

Mar. 26, 2013  (JP) ................. 2013-063728
Jun. 24, 2013  (JP) ................. 2013-131398

(51) Int. Cl.
*G02F 1/00*  (2006.01)
*G02F 1/167*  (2006.01)

(52) U.S. Cl.
CPC ........ *G02F 1/167* (2013.01); *G02F 2001/1678* (2013.01)

(58) Field of Classification Search
CPC ............ G02F 1/167; G02F 2001/1672; G02F 2001/1674; G02F 2001/1676; G02F 2001/1678

USPC ..................... 204/450, 600; 345/107; 349/33; 359/237–324; 430/31, 32, 34, 38
See application file for complete search history.

(56) References Cited

U.S. PATENT DOCUMENTS

| | | | | |
|---|---|---|---|---|
| 2008/0112040 | A1* | 5/2008 | Suwabe .................. | G02F 1/167 359/296 |
| 2010/0020384 | A1* | 1/2010 | Machida et al. .............. | 359/296 |
| 2011/0310465 | A1* | 12/2011 | Takanashi .............. | D04H 1/728 359/296 |

FOREIGN PATENT DOCUMENTS

JP    2012-022296    2/2012

* cited by examiner

*Primary Examiner* — Ricky Mack
*Assistant Examiner* — Gary O'Neill
(74) *Attorney, Agent, or Firm* — Chip Law Group

(57) ABSTRACT

An electrophoretic display device with a plurality of first particles which migrate between a remain region and a display region in response to an electric field, as well as a plurality of non-migrating second particles which are fixedly disposed between the remain and display regions and which (a) allow the plurality of first particles to pass between the remain and display regions in response to the electric field, and (b) cover the plurality of first particles when the first particles are disposed in the remain region.

18 Claims, 11 Drawing Sheets

DISPLAY UNIT AND ELECTRONIC APPARATUS

CROSS REFERENCE TO RELATED APPLICATIONS

This application claims the benefit of Japanese Priority Patent Applications JP2013-63728 filed Mar. 26, 2013 and JP2013-131398 filed Jun. 24, 2013, the entire contents of each of which are incorporated herein by reference.

BACKGROUND

The present technology relates to a display unit and an electronic apparatus each including an electrophoresis device.

In recent years, low-power display units (displays) with high image quality have been in increasing demand, as mobile equipment such as portable telephones and portable information terminals has become widespread. In particular, recently, electronic book delivery businesses have begun, and a display having display quality suitable for reading purpose has been desired.

As such a display, various displays such as a cholesteric liquid crystal display, an electrophoretic display, an electric-redox-type display, and a twisting ball display have been proposed. For reading purpose, reflection-type displays are advantageous. In the reflection-type displays, bright display is performed using reflection (diffusion) of outside light in a manner similar to that of paper and thus, display quality close to that of paper is achieved.

Among the reflection-type displays, an electrophoretic display utilizing an electrophoretic phenomenon has a high response speed while consuming low power, and thus is expected as a strong candidate. As a display method thereof, mainly the following two methods have been proposed.

A first method is a method in which two kinds of charged particles are dispersed in insulating liquid, and the charged particles are moved in response to an electric field. These two kinds of charged particles are different from each other in terms of optical reflection properties, and are also of opposite polarity. In this method, an image is displayed by a change in distribution of the charged particles in response to an electric field.

A second method is a method in which charged particles are dispersed in insulating liquid, and a porous layer is disposed in the insulating liquid (for example, see Japanese Unexamined Patent Application Publication No. 2012-22296). In this method, the charged particles are moved through pores of the porous layer in response to an electric field. Non-migrating particles different from the charged particles in terms of optical reflection properties are held in the porous layer.

The particle size of a particle used in such an electrophoretic display may be determined, for example, based on the scattering theory of Mie. According to the scattering theory of Mie, in a visible light region, light scattering efficiency (of white) at the time of bright display may be increased using particles having, for example, a particle size of about 200 nm to about 350 nm, which is a particle size of about half the wavelength of the visible light region.

SUMMARY

As described above, at least two kinds of particles (for example, a particle for bright display and a particle for dark display) that have optical reflectance different from each other are present in the electrophoretic display. For this reason, when one display (for example, bright display) is performed, it is necessary to hide (shield) the particle for the other display (for example, the particle for dark display), in order to enhance display properties. When this contrast ratio is low, the display properties deteriorate.

It is desirable to provide a display unit and an electronic apparatus in each of which one type of particles is capable of efficiently covering the other type of particles.

One embodiment of the present disclosure is directed to an electrophoretic display device. The device comprises a plurality of first particles configured to migrate between a remain region and a display region in response to an electric field, as well as a plurality of non-migrating second particles fixedly disposed between the remain and display regions and configured to (a) allow the plurality of first particles to pass between the remain and display regions in response to the electric field, and (b) cover the plurality of first particles when the first particles are disposed in the remain region.

Another embodiment of the present disclosure is directed to a display apparatus comprising a display section including an electrophoretic display unit. The display unit includes a plurality of first particles configured to migrate between a remain region and a display region in response to an electric field, as well as a plurality of non-migrating second particles fixedly disposed between the remain and display regions and configured to (a) allow the plurality of first particles to pass between the remain and display regions in response to the electric field, and (b) cover the plurality of first particles when the first particles are disposed in the remain region.

According to the display unit and the electronic apparatus of the above-described embodiments of the present technology, the one or more large particles are included, together with the one or more small particles, in the second particles. Therefore, the first particles are allowed to be covered by the second particles efficiently.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the present disclosure, and are incorporated in and configure a part of this specification. The drawings illustrate embodiments and, together with the specification, serve to describe the principles of the technology.

DETAILED DESCRIPTION

An embodiment of the present technology will be described below in detail with reference to the drawings. It is to be noted that the description will be provided in the following order.
1. Embodiment (electrophoresis device)
2. Application Examples (display unit and electronic apparatus)
3. Examples

EMBODIMENT

Figure 1:
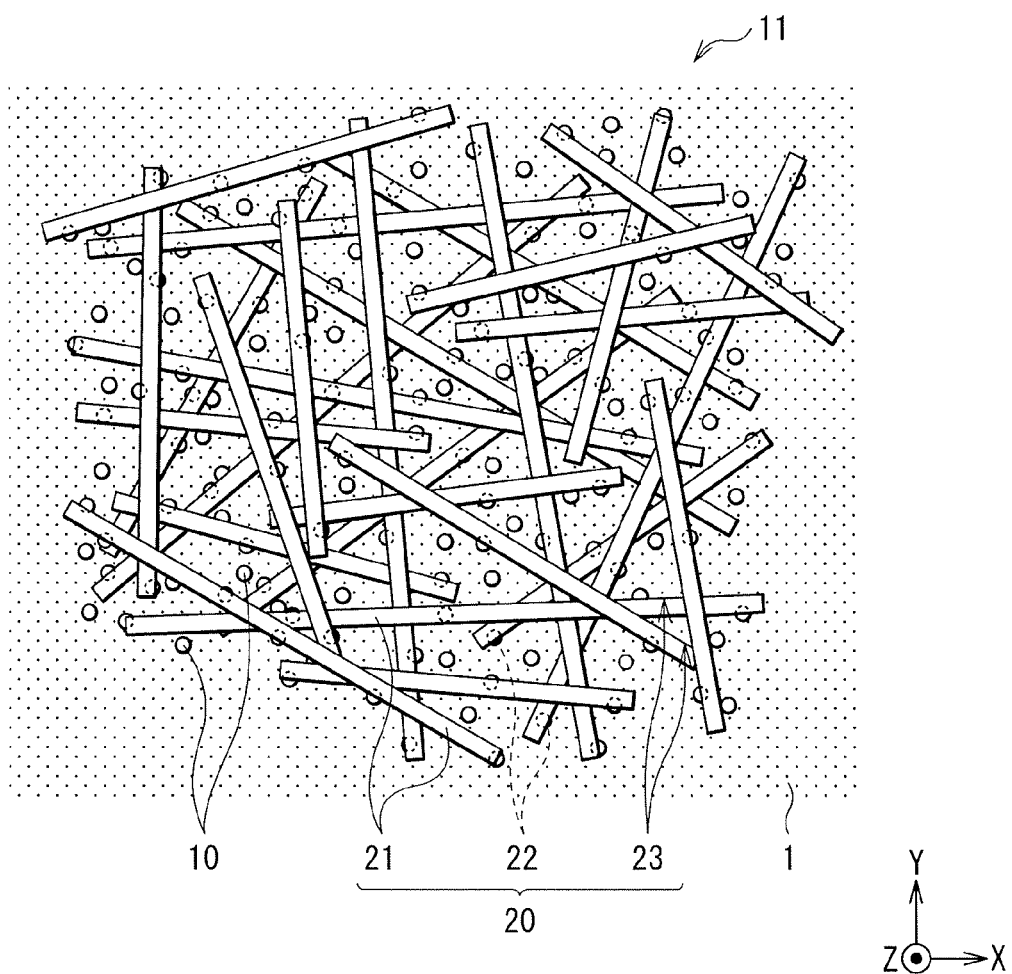
FIG. 1 is a plan view illustrating a configuration of an electrophoresis device according to an embodiment of the present technology.
Figure 2:
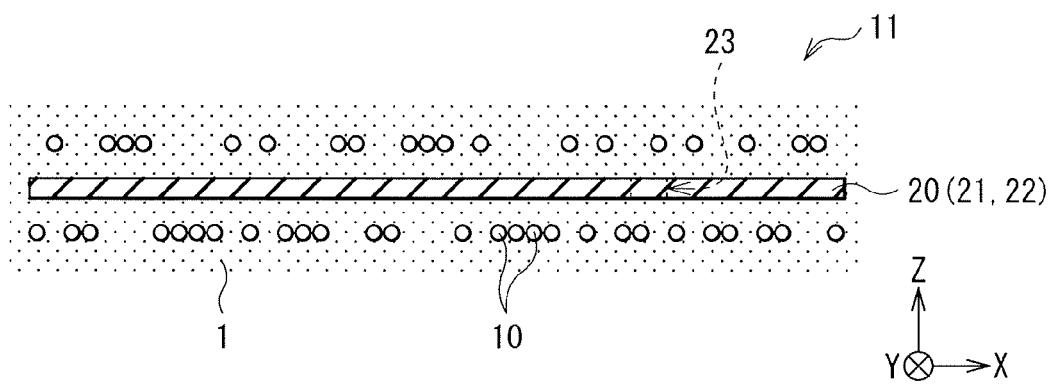
FIG. 2 is a cross-sectional diagram illustrating a configuration of the electrophoresis device illustrated in FIG. 1.

FIG. 1 illustrates a plane configuration of an electrophoresis device (an electrophoresis device 11) according to an embodiment of the present technology, and FIG. 2 illustrates a cross-sectional configuration of the electrophoresis device 11. The electrophoresis device 11 effects contrast by utilizing an electrophoretic phenomenon, and may be applied to various electronic apparatuses such as a display unit, for example. In the electrophoresis device 11, migrating particles 10 (first particles) and a porous layer 20 having pores 23 are included in insulating liquid 1. It is to be noted that FIGS. 1 and 2 each schematically illustrate the configuration of the electrophoresis device 11, and the actual size and shape thereof may be different from those illustrated therein.

The insulating liquid 1 may be configured of, for example, an organic solvent such as paraffin and isoparaffin. For the insulating liquid 1, one kind of organic solvent may be used, or two or more kinds of organic solvents may be used. A viscosity and a refractive index of the insulating liquid 1 may be preferably as low as possible. When the viscosity of the insulating liquid 1 is made low, mobility (a response speed) of the migrating particle 10 improves. Further, energy (power to be consumed) necessary for movement of the migrating particle 10 becomes low accordingly. When the refractive index of the insulating liquid 1 is reduced, a difference between the insulating liquid 1 and the porous layer 20 in terms of refractive index grows, which increases reflectance of the porous layer 20.

For example, a coloring agent, a charge control agent, a dispersion stabilizer, a viscosity modifier, a surfactant, a resin, and/or the like may be added to the insulating liquid 1.

The migrating particle 10 dispersed in the insulating liquid 1 is one or more charged particles, and the migrating particle 10 thus charged moves through the pore 23, in response to an electric field. The migrating particle 10 has arbitrary optical reflection properties (optical reflectance), and contrast is effected by a difference between the optical reflectance of the migrating particle 10 and that of the porous layer 20. For example, the migrating particle 10 may perform bright display while the porous layer 20 may perform dark display, or the migrating particle 10 may perform dark display while the porous layer 20 may perform bright display.

When the electrophoresis device 11 is viewed from outside, the migrating particle 10 may be visually recognized as, for example, white or a color close to white in a case in which the migrating particle 10 performs bright display. The migrating particle 10 may be visually recognized as, for example, black or a color close to black in a case in which the migrating particle 10 performs dark display. The color of the migrating particle 10 as described above is not limited in particular, as long as the contrast is allowed to be effected.

The migrating particle 10 may be configured of, for example, a particle (powder) of a material such as an organic pigment, an inorganic pigment, a dye, a carbon material, a metallic material, a metal oxide, glass, and a polymer material (resin). Of these, any one kind or two or more kinds may be used for the migrating particle 10. The migrating particle 10 may also be configured using a crushed particle or a capsule particle of a resin solid content including the above-described particle. It is to be noted that materials corresponding to the above-listed carbon material, metallic material, metal oxide, glass, and polymer material are excluded from materials corresponding to the above-mentioned organic pigment, inorganic pigment, and dye. The particle size of the migrating particle 10 may be, for example, about 30 nm to about 300 nm.

Examples of the organic pigment may include azo-based pigments, metal-complex-azo-based pigments, polycondensed azo-based pigments, flavanthrone-based pigments, benzimidazolone-based pigments, phthalocyanine-based pigments, quinacridone-based pigments, anthraquinone-based pigments, perylene-based pigments, perinone-based pigments, anthrapyridine-based pigments, pyranthrone-based pigments, dioxazine-based pigments, thioindigo-based pigments, isoindolinone-based pigments, quinophthalone-based pigments, and indanthrene-based pigments. Examples of the inorganic pigment may include flowers of zinc (zinc oxide), antimony white, black iron oxide, titanium boride, red iron oxide, mapico yellow, minium, cadmium yellow, zinc sulphide, lithopone, barium sulfide, cadmium selenide, calcium carbonate, barium sulfate, lead chromate, lead sulfate, barium carbonate, white lead, and alumina white. Examples of the dye may include nigrosine-gased dyes, azo-based dyes, phthalocyanine-based dyes, quinophthalone-based dyes, anthraquinone-based dyes, and methine-based dyes. Examples of the carbon material may include carbon black. Examples of the metallic material may include gold, silver, and copper. Examples of the metal oxide may include titanium oxide, zinc oxide, zirconium oxide, barium titanate, potassium titanate, copper-chromium oxide, copper-manganese oxide, copper-iron-manganese oxide, copper-chromium-manganese oxide, and copper-iron-chromium oxide. Examples of the polymer material may include a polymer compound into which a functional group having an optical absorption spectrum in a visible light region is introduced. As long as a polymer compound having the optical absorption spectrum in the visible light region is adopted, the kind thereof is not limited in particular.

A specific material of the migrating particle 10 may be selected, for example, depending on a role played by the migrating particle 10 to effect the contrast. When the migrating particle 10 performs bright display, the metal oxide or the like such as titanium oxide, zinc oxide, zirconium oxide, barium titanate, and potassium titanate may be used for the migrating particle 10. When the migrating particle 10 performs dark display, the carbon material such as carbon black, the metal oxide such as copper-chromium oxide, copper-manganese oxide, copper-iron-manganese oxide, copper-chromium-manganese oxide, and copper-iron-chromium oxide, or the like may be used for the migrating particle 10. Above all, preferably, the carbon material may be used for the migrating particle 10. The migrating particle 10 made of the carbon material exhibits superior chemical stability, mobility, and light absorption.

The content (concentration) of the migrating particle 10 in the insulating liquid 1 is not limited in particular, but may be, for example, about 0.1 wt % to about 10 wt %. In this concentration range, cover properties and mobility of the migrating particle 10 are ensured. Specifically, when the content of the migrating particle 10 is less than 0.1 wt %, shielding (hidingt) of the porous layer 20 by the migrating particle 10 may be difficult, and contrast may not be sufficiently effected. On the other hand, when the content of the migrating particle 10 is more than 10 wt %, dispersibility of the migrating particle 10 may decrease, which makes the migrating particle 10 move less easily, thereby leading to a possibility of occurrence of agglomeration.

Preferably, the migrating particle 10 may be readily dispersed and charged in the insulating liquid 1 for a long time, and may be less easily adsorbed on the porous layer 20. Therefore, for example, a dispersant may be added to the insulating liquid 1. The dispersant and an electric charge modifier may be used together.

The dispersant or the electric charge modifier may have, for example, either positive charges or negative charges, or both types of charges. The dispersant or the electric charge modifier is provided to increase an electric charge amount in the insulating liquid 1, and also to disperse the migrating particle 10 by electrostatic repulsion. Examples of such a dispersant may include the Solsperse series available from The Lubrizol Corporation, the BYK series as well as the Anti-Terra series available from BYK-Chemie GmbH, and the Span series available from TCI America.

In order to improve the dispersibility of the migrating particle 10, a surface treatment may be applied to the migrating particle 10. Examples of the surface treatment may include a rosin treatment, a surfactant treatment, a pigment derivative treatment, a coupling agent treatment, a graft polymerization treatment, and a microencapsulation treatment. In particular, any of the graft polymerization treatment, the microencapsulation treatment, and a combination of these treatments makes it possible to maintain long-term dispersion stability of the migrating particle 10.

For the surface treatment described above, for example, a material (an adsorptive material) that includes a functional group capable of being adsorbed on the surface of the migrating particle 10 and a polymeric functional group. The functional group capable of being adsorbed is determined according to the material forming the migrating particle 10. For example, when the migrating particle 10 is configured of the carbon material such as carbon black, an aniline derivative such as 4-vinyl aniline may be allowed to be adsorbed. Further, for example, when the migrating particle 10 is configured of the metal oxide, an organosilane derivative such as methacrylate-3-(trimethoxysilyl)propyl may be allowed to be adsorbed. Examples of the polymeric functional group may include a vinyl group, an acrylic group, and a methacryl group.

A surface treatment may be performed by introducing a polymeric functional group onto the surface of the migrating particle 10, and effecting graft thereon (a graft material). The graft material may have, for example, a polymeric functional group and a functional group for dispersion. The functional group for dispersion disperses the migrating particle 10 in the insulating liquid 1, and maintains dispersibility by steric hindrance thereof. When the insulating liquid 1 is, for example, paraffin, a branched alkyl group or the like may be used as the functional group for dispersion. Examples of the polymeric functional group may include a vinyl group, an acrylic group, and a methacryl group. In order to effect polymerization and graft of the graft material, a polymerization initiator such as azobisisobutyronitrile (AIBN), for example, may be used.

Details of the way of dispersing the migrating particle 10 in the insulating liquid 1 as described above are described in books such as "Dispersion technology of ultrafine particles and evaluation thereof: surface treatment and fine grinding, as well as dispersion stability in air/liquid/polymer (Science & Technology Co., Ltd.)".

The porous layer 20 is capable of shielding the migrating particle 10. The porous layer 20 has a fibrous structure 21 and non-migrating particles 22 (second particles) held in the fibrous structure 21. The porous layer 20 is a three-dimensional structure formed using the fibrous structure 21 (an irregular network structure like a nonwoven fabric), and has a plurality of openings (pores 23). Configuring the three-dimensional structure of the porous layer 20 by using the fibrous structure 21 effects diffused reflection (multiple scattering) of light (outside light), thereby increasing the reflectance of the porous layer 20. Therefore, even in a case in which the porous layer 20 has a small thickness, it is possible to obtain high reflectance, and also to reduce energy necessary to move the migrating particle 10, while improving the contrast of the electrophoresis device 11. In addition, an average pore size of the pores 23 is made large, and moreover, a large number of pores 23 are provided in the porous layer 20. This allows the migrating particle 10 to move easily through the pore 23, increases response speed, and further reduces the energy necessary to move the migrating particle 10. The thickness of the porous layer 20 as described above may be, for example, about 5 μm to about 100 μm.

The fibrous structure 21 is a fibrous substance having a length that is sufficiently long relative to a fiber diameter. For example, a plurality of fibrous structures 21 may be gathered and stacked at random, to configure the porous layer 20. The porous layer 20 may be configured by twisting the single fibrous structure 21 at random. Alternatively, part configured of the single fibrous structure 21 and part configured of the plurality of fibrous structures 21 may exist in a mixed manner in the porous layer 20.

The fibrous structure 21 may be configured of, for example, a polymer material, an inorganic material, or the like. Examples of the polymer material may include polymethyl methacrylate, nylon, polylactic acid, polyamide, polyimide, polyethylene terephthalate, polyacrylonitrile, polyethylene oxide, polyvinylcarbazole, polyvinyl chloride, polyurethane, polystyrene, polyvinyl alcohol, polysulfone, polyvinylpyrrolidone, polyvinylidene fluoride, polyhexafluoropropylene, cellulose acetate, collagen, gelatin, chitosan, and copolymers of these materials. Examples of the inorganic material may include titanium oxide. The polymer material may be preferably used for the fibrous structure 21. This is because the polymer material is low in reactivity to light and the like, and chemically stable, for example. In other words, use of the polymer material prevents an unintended decomposition reaction of the fibrous structure 21. When the fibrous structure 21 is configured of a material with high reactivity, the surface thereof may be preferably coated with an arbitrary protective layer.

The fibrous structure 21 may, for example, extend linearly. The fibrous structure 21 may have any shape, and may be, for example, curled or bent at some point. Alternatively, the fibrous structure 21 may be branched at some point.

An average fiber diameter of the fibrous structure 21 may be, for example, preferably, about 50 nm or more and about 2,000 nm or less, but may fall outside this range. Providing a small average fiber diameter allows diffused reflection of light to occur easily, and also allows the size of the pore 23 to be large. The fiber diameter of the fibrous structure 21 is determined so that the fibrous structure 21 is allowed to hold the non-migrating particle 22. It may be possible to measure the average fiber diameter through, for example, microscopy using a scanning electron microscope or the like. An average length of the fibrous structure 21 is arbitrary. The fibrous structure 21 may be formed by, for example, a phase separation method, a phase inversion method, an electrostatic (electric field) spinning method, a melt spinning method, a wet spinning method, a dry spinning method, a gel spinning method, a sol-gel method, a spray coating method, or the like. Use of any of these methods makes it possible to easily and stably form the fibrous structure 21 having a length that is sufficiently long relative to the fiber diameter.

The fibrous structure 21 may be preferably configured using a nanofiber. Here, the nanofiber is a fibrous substance having a fiber diameter of about 1 nm to about 1,000 nm, and having a length hundred times or more the fiber diameter. Use of such a nanofiber for the fibrous structure 21 makes the diffused reflection of light easily occur and improves the reflectance of the porous layer 20 further. In other words, it is possible to enhance the contrast of the electrophoresis device 11. In addition, in the fibrous structure 21 made of the nanofiber, a proportion of the pores 23 occupying a unit volume is made large, and the movement of the migrating particle 10 through the pore 23 is made easy. Therefore, it is possible to reduce the energy necessary for the movement of the migrating particle 10. The fibrous structure 21 made of the nanofiber may be preferably formed by an electrostatic spinning method. Use of the electrostatic spinning method makes it possible to form the fibrous structure 21 having a small fiber diameter, easily and stably.

For the fibrous structure 21, a structure whose optical reflectance is different from that of the migrating particle 10 may be preferably used. This makes it easy to form contrast based on a difference between the porous layer 20 and the migrating particle 10 in terms of optical reflectance. The fibrous structure 21 exhibiting optical transparency (colorlessness and transparency) in the insulating liquid 1 may also be used.

The pore 23 is configured by overlaps among the plurality of fibrous structures 21, or twists of the single fibrous structure 21. The pore 23 may preferably have an average pore size as large as possible, to allow the migrating particle 10 to move through the pore 23 easily. The average pore size of the pore 23 may be, for example, about 0.1 μm to about 10 μm.

Figure 3:
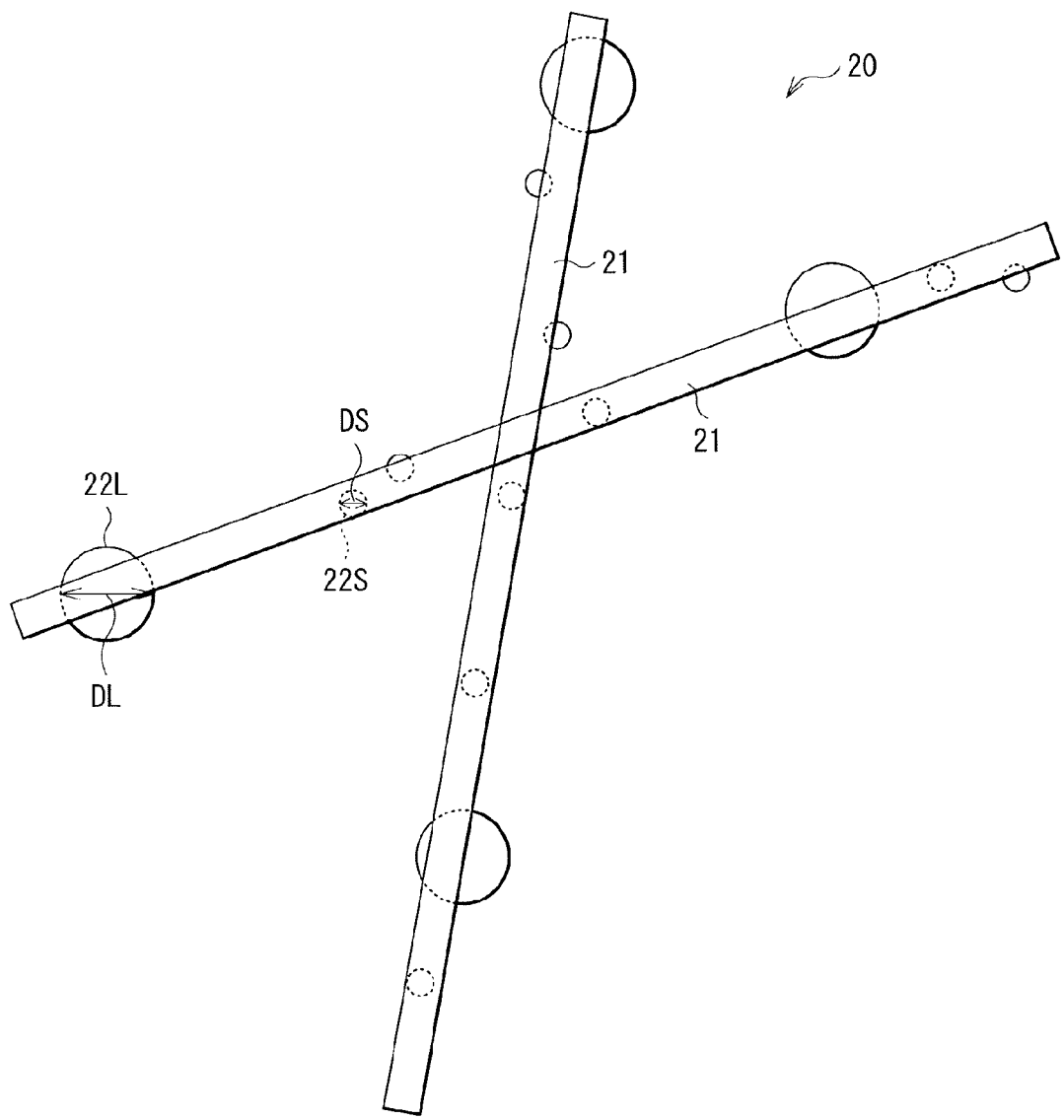
FIG. 3 is a plan view illustrating a configuration of non-migrating particles illustrated in FIG. 1.

The non-migrating particle 22 is fixed to the fibrous structure 21, and the optical reflectance thereof is different from that of the migrating particle 10. As illustrated in FIG. 3, in the present embodiment, the non-migrating particles 22 include one or more large particles 22L and one or more small particles 22S having the primary particle sizes different from each other (particle sizes DL and DS). As will be described later in detail, this makes it possible to shield the migrating particle 10 effectively by using the large particle 22L, while maintaining optical properties of the non-migrating particle by using the small particle 22S. Here, the primary particle size is a minimum particle size of each of the large particle 22L and the small particle 22S. For example, the primary particle size may represent a particle size of each particle when the particles (the large particles 22L and the small particles 22S) are agglomerated and bind together.

The particle size of the small particle 22S may be preferably adjusted in accordance with optical properties necessary for the non-migrating particle 22. For example, in a case in which the porous layer 20 (the non-migrating particle 22) performs bright display, the particle size DS of the small particle 22S may be determined so that the small particle 22S has high optical reflectance. In a case in which the porous layer 20 (the non-migrating particle 22) performs dark display, the particle size DS of the small particle 22S may be determined so that the small particle 22S has low optical reflectance. In the case in which the porous layer 20 performs bright display, the particle size DS of the small particle 22S may be, for example, less than about 400 nm, specifically, about 100 nm to about 350 nm, and preferably about 200 nm to about 300 nm. In this range of the particle size DS of the small particle 22S, light scattering efficiency of a visible light region reaches the highest, and the optical reflectance of the non-migrating particle 22 improves, based on the scattering theory of Mie.

The large particle 22L is provided to increase an occupied volume of the non-migrating particle 22 in the insulating liquid 1, and to reduce optical transmittance. This allows the non-migrating particle 22 to cover the migrating particle 10 effectively. Therefore, it is possible to improve a contrast ratio of the migrating particle 10. It is enough that the particle size DL of the large particle 22L is larger than the particle size DS of the small particle 22S, and the particle diameter DL of the large particle 22L may be preferably, for example, about double to about ten times the particle size DS of the small particle 22S. The particle size DL of the large particle 22L may be, for example, 400 nm or more, and preferably about 400 nm to about 1,000 nm, more preferably about 400 nm to about 700 nm. When the particle size DL exceeds 1,000 nm, the large particle 22L may obstruct movement of the migrating particle 10.

The non-migrating particles 22 may preferably include the small particles 22S more than the large particles 22L in terms of percentage by weight (wt %). For example, the percentage by weight of the large particles 22L in the non-migrating particles 22 may be preferably less than 40 wt %. Inclusion of the small particles 22S in large quantity may allow the optical properties of the non-migrating particle 22 to be improved, for example, based on the scattering theory of Mie. In addition, a moving path of the migrating particle 10 is secured and thus, a response speed of the electrophoresis device 11 is maintained. It may be possible to confirm the weight ratio between the small particle 22S and the large particle 22L, as well as the particle sizes DS and DL of the small particle 22S and the large particle 22L, by using, for example, a scanning microscope.

The non-migrating particles 22 including the small particle 22S and the large particle 22L as described above may be configured of a material similar to that of the migrating particle 10 described above. Specifically, when the non-migrating particle 22 (the porous layer 20) performs bright display, it is possible to use the above-described material of the case in which the migrating particle 10 performs bright display. When the non-migrating particle 22 performs dark display, it is possible to use the above-described material of the case in which the migrating particle 10 performs dark display. When bright display is performed by the porous layer 20, the non-migrating particle 22 may be preferably configured of a metal oxide. This makes it possible to obtain superior chemical stability, fixity, and light reflectivity. Above all, a metal oxide having a high refractive index, exemplified by a rutile-type titanium oxide, may be preferably used to configure the non-migrating particle 22. The material of the non-migrating particle 22 and that of the migrating particle 10 may be the same or different. The material of the small particle 22S and that of the large particle 22L may be the same or different. The non-migrating particle 22 may be completely embedded in the fibrous structure 21, or may be partially exposed from the fibrous structure 21. A color visually recognized from outside when the non-migrating particle 22 performs bright display or dark display is similar to that described above for the migrating particle 10.

The porous layer 20 as described above may be formed, for example, by the following method. First, spinning solution may be prepared by, for example, dissolving the material of the fibrous structure 21 such as a polymer material in an organic solvent or the like. Next, the non-migrating particles 22 (the small particles 22S and the large particles 22L) are added to this spinning solution which is then stirred sufficiently to disperse the non-migrating particles 22. Finally, the non-migrating particles 22 may be fixed to the fibrous structure 21 by, for example, performing spinning using this spinning solution through an electrostatic spinning method, so that the porous layer 20 is formed. For the porous layer 20, the pore 23 may be formed by perforating a polymeric film with a laser. Alternatively, a cloth woven of synthetic fibers and/or the like, an open-cell foam porous polymer, or the like may be used for the porous layer 20.

As described above, the electrophoresis device 11 effects contrast based on a difference between the optical reflectance of the migrating particle 10 and the optical reflectance of the porous layer 20. Specifically, of the migrating particle 10 and the porous layer 20, one that performs bright display has the optical reflectance higher than that of the other that performs dark display. Preferably, the optical reflectance of the non-migrating particle 22 may be higher than that of the migrating particle 10, so that bright display is performed by the porous layer 20 and dark display is performed by the migrating particle 10. Performing such display considerably increases the optical reflectance at the time of bright display, by utilizing the diffused reflection of light caused by the porous layer 20 (the three-dimensional structure). Thus, the contrast also improves to a great extent accordingly.

In the electrophoresis device 11, the migrating particle 10 moves through the pore 23 of the porous layer 20 in a region to which an electric field is applied. Depending on whether a region is a region where the migrating particle 10 moves or a region where the migrating particle 10 does not move, either bright display or dark display is performed to display an image. Here, the non-migrating particles 22 include the large particle 22L and the small particle 22S having the primary particle sizes (the particle sizes DL and DS) different from each other. Therefore, it is possible to hide the migrating particle 10 efficiently. This will be described below by taking, as an example, a case in which the porous layer 20 performs bright display and the migrating particle 10 performs dark display.

In order to improve the display properties of the electrophoresis device 11, the particle size of the non-migrating particle 22 may be determined based on the scattering theory of Mie as described above. For example, the light scattering efficiency may be maximum when the primary particle size of the non-migrating particle is about 200 nm to about 350 nm. However, there is such a disadvantage that even if a non-migrating particle having this particle size is used, it is difficult to sufficiently hide the migrating particle and therefore, the optical reflectance at the time of bright display declines.

In order to hide the migrating particle sufficiently with the non-migrating particle at the time of bright display, it is conceivable to increase the number of non-migrating particles. In this method, however, it is difficult to disperse the non-migrating particles uniformly in the fiber structure, and the display properties of the electrophoresis device may be reduced by occurrence of agglomeration of the particles. Moreover, an increase in the number of non-migrating particles may obstruct the movement of the migrating particles, thereby decreasing the response speed.

In contrast, in the electrophoresis device 11, the non-migrating particles 22 include, together with the small particle 22S, and the large particle 22L having the particle size DL that is larger than the particle size DS of the small particle 22S. Thus, at the time of bright display, the migrating particles 10 are covered by the non-migrating particles 22 over a wider region than that in a case in which the non-migrating particles 22 are configured using only the small particles 22S. In other words, it is possible to hide the migrating particles 10 effectively, without increasing the number of the non-migrating particles 22. Therefore, the optical reflectance of bright display improves.

Further, inclusion of the large particles 22L in the non-migrating particles 22 makes it possible to reduce a diffuse reflection angle of light (a diffusion angle). Thus, for example, when the electrophoresis device 11 is applied to a display unit (for example, a display unit 3 in FIG. 6 to be described later), it may be possible to enhance light extraction efficiency in a front direction with respect to a display surface, and to increase front luminance. This will be described below.

Figure 4A:
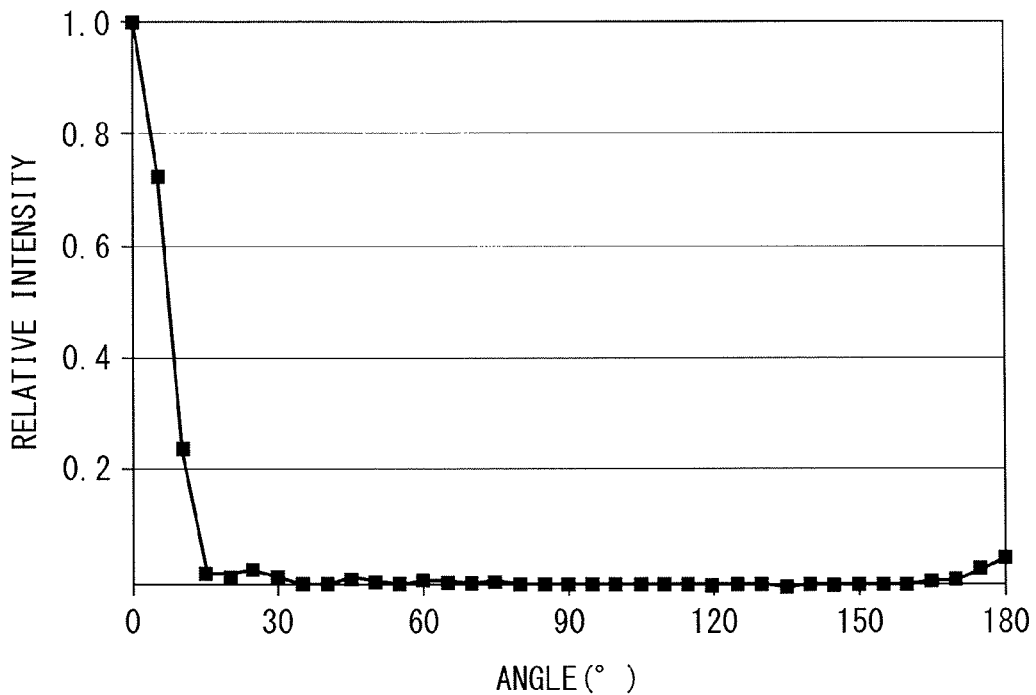
FIG. 4A is a diagram illustrating a diffusion state of light when particles having a particle size of about 1,000 nm are irradiated with light having a wavelength of about 550 nm.
Figure 4B:
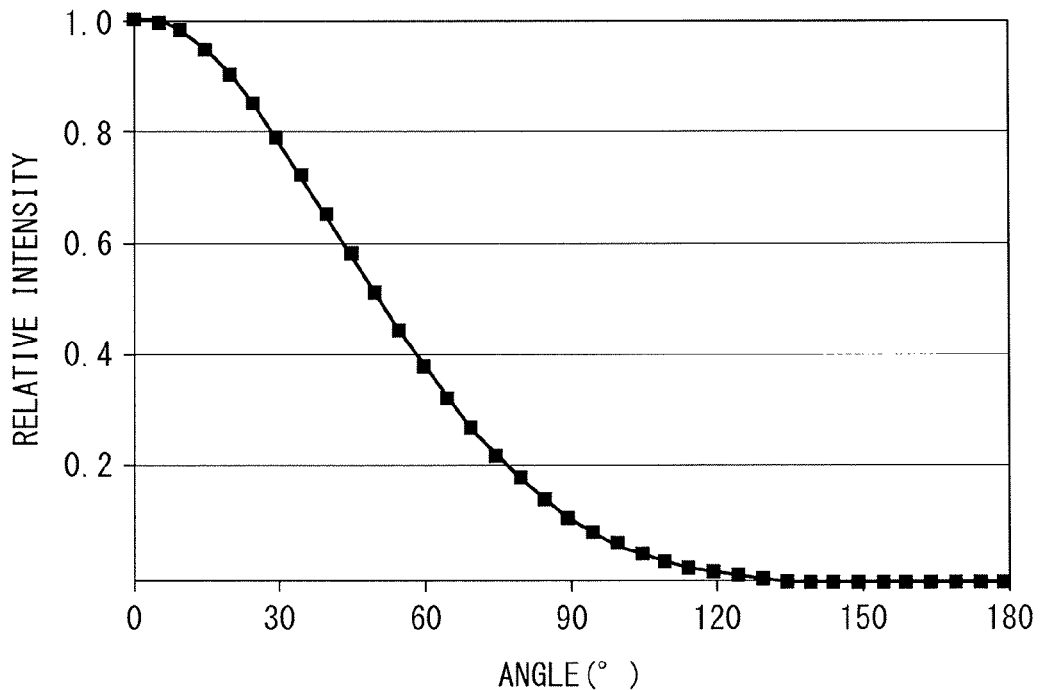
FIG. 4B is a diagram illustrating a diffusion state of light when particles having a particle size of about 200 nm are irradiated with light having a wavelength of about 550 nm.

It is known from the scattering theory of Mie that a light diffusion angle indicates particle size dependence. FIG. 4A illustrates a relationship between diffusion angle and optical intensity (relative intensity) of light at time when particles having a particle size of about 1,000 nm are irradiated with light of a wavelength of about 550 nm. FIG. 4B illustrates a relationship between diffusion angle and optical intensity of light at the time when particles having a particle size of about 200 nm are irradiated with light of a wavelength of about 550 nm. Such measurement has revealed that the light diffuses to the extent of about 120 degrees when the particles having the particle size of about 200 nm are used (FIG. 4B), whereas diffusion of the light is allowed to be suppressed to the extent of about 15 degrees when the particles having the particle size of about 1,000 nm are used.

Figure 5A:
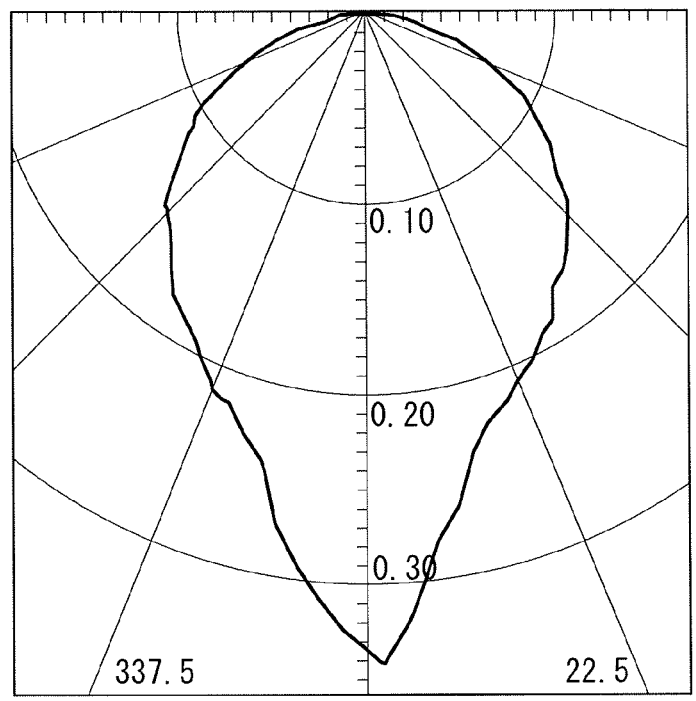
FIG. 5A is a diagram illustrating a simulation of a diffusion state of light emitted from a display unit.
Figure 5B:
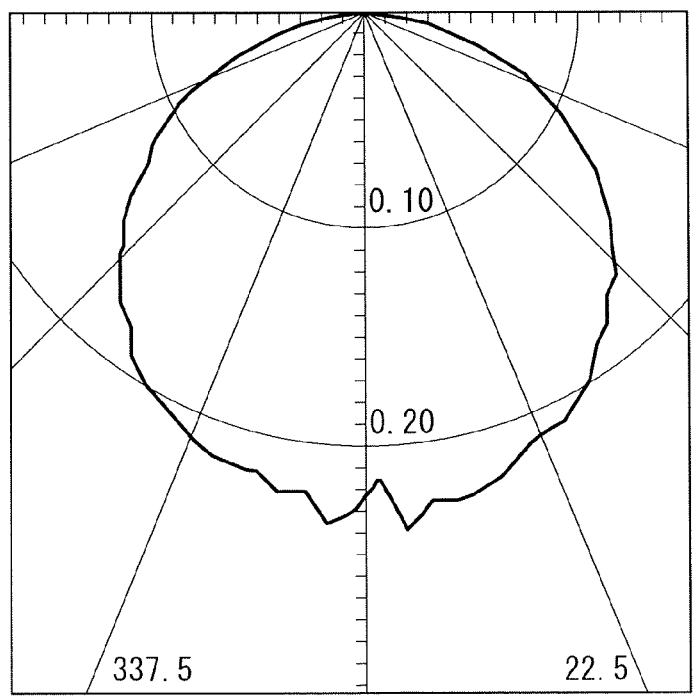
FIG. 5B is a diagram illustrating a simulation of a diffusion state of light, which is performed on a display unit including particles having particle size different from that in FIG. 5A.

FIG. 5A illustrates a result of simulating a diffusion state of light emitted from a display unit that is configured using particles having a particle size of about 1,000 nm as non-migrating particles. A mean free path was 0.002462. It is to be noted that, here, the mean free path refers to a statistical mean distance over which light (a light ray) travels until it reaches a scattering particle. FIG. 5B illustrates a result of performing a similar simulation in a case in which particles having a particle size of about 200 nm are used as non-migrating particles. A mean free path of this simulation was 0.0024166. It is to be noted that FIG. 5A illustrates, in the form of polar coordinates, relative optical intensity with respect to a viewing angle in the diffusion state of the particles having the particle size of about 1,000 nm, and FIG. 5B illustrates that in the diffusion state of the particles having the particle size of about 200 nm. It is also apparent from these simulation results that using the particles of the larger particle size (FIG. 5A) reduces the diffusion angle of light, thereby improving the luminance in the front direction.

In this way, inclusion of the large particles 22L in the non-migrating particles 22 makes it possible to increase the front luminance of a display unit or the like. In particular, in a case of application to a display unit performing color display, multiple reflection is suppressed and thus, it is possible to obtain luminance (reflectance) higher than that in a case in which non-migrating particles are configured using only small particles.

As described above, in the electrophoresis device 11 of the present embodiment, the non-migrating particles 22 include the small particle 22S and the large particle 22L which have different primary particle sizes from each other. Therefore, it is possible to hide the migrating particles 10 efficiently, while maintaining the optical properties of the non-migrating particles 22.

Further, it is possible to hide the migrating particles 10 without increasing the number of the non-migrating particles 22 and thus, declines in dispersibility and response speed of the non-migrating particles 22 are preventable.

Furthermore, since the large particles 22L are included in the non-migrating particles 22, it is possible to increase the front luminance of a display unit or the like.

APPLICATION EXAMPLES

Display Unit

Next, an application example of the above-described electrophoresis device 11 will be described. The electrophoresis device 11 may be applied to, for example, a display unit.

Figure 6:
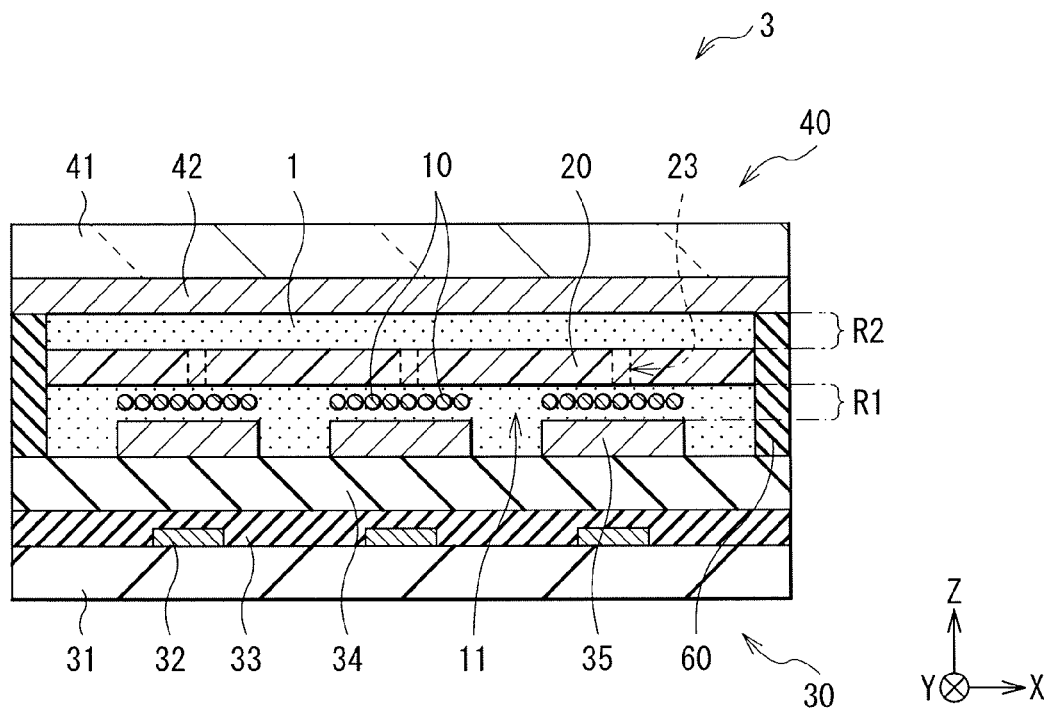
FIG. 6 is a cross-sectional diagram illustrating a configuration of a display unit using the electrophoresis device illustrated in FIG. 1 etc.

FIG. 6 illustrates an example of a cross-sectional configuration of a display unit (the display unit 3) using the electrophoresis device 11. The display unit 3 is an electrophoretic display (a so-called electronic paper display) that displays an image (for example, character information) by utilizing an electrophoretic phenomenon. The display unit 3 includes a drive substrate 30 and a counter substrate 40 between which the electrophoresis device 11 is provided. A space between the drive substrate 30 and the counter substrate 40 is adjusted to a predetermined extent by a spacer 60.

The drive substrate 30 may include, for example, a TFT (Thin Film Transistor) 32, a protective layer 33, a planarizing insulating layer 34, and a pixel electrode 35 in this order, on one surface of a plate-like member 31. The TFT 32 and the pixel electrode 35 may be arranged, for example, in a matrix or in a segmented state, corresponding to a pixel arrangement.

The plate-like member 31 may be configured of, for example, an inorganic material, a metallic material, a plastic material, or the like. Examples of the inorganic material may include silicon (Si), silicon oxide ($SiO_x$), silicon nitride ($SiN_x$), and aluminum oxide (AlOx). Examples of the silicon oxide may include glass and spin-on-glass (SOG). Examples of the metallic material may include aluminum (Al), nickel (Ni), and stainless steel. Examples of the plastic material may include polycarbonate (PC), polyethylene terephthalate (PET), polyethylene naphthalate (PEN), and polyethyl ether ketone (PEEK).

In the display unit 3, an image is displayed on the counter substrate 40 side and thus, the plate-like member 31 may be optically non-transparent. The plate-like member 31 may be configured using a rigid substrate such as a wafer, or may be configured using a thin-layer of glass, a film, or the like having flexibility. The display unit 3 of a flexible (foldable) type is achievable by using a flexible material for the plate-like member 31.

The TFT 32 is a switching device used to select a pixel. The TFT 32 may be an inorganic TFT using an inorganic semiconductor layer as a channel layer, or may be an organic TFT using an organic semiconductor layer as a channel layer. Each of the protective layer 33 and the planarizing insulating layer 34 may be configured of, for example, an insulating resin material such as polyimide. When a surface of the protective layer 33 is sufficiently flat, the planarizing insulating layer 34 may be omitted. The pixel electrode 35 may be formed of, for example, a metallic material such as gold (Au), silver (Ag), and copper (Cu). The pixel electrode 35 is connected to the TFT 32 through a contact hole (not illustrated) provided in the protective layer 33 and the planarizing insulating layer 34.

The counter substrate 40 may include, for example, a plate-like member 41 and a counter electrode 42. The counter electrode 42 is provided on the entire surface (a surface facing the drive substrate 30) of the plate-like member 41. The counter electrode 42 may be arranged in a matrix or in a segmented state in a manner similar to that of the pixel electrode 32.

The plate-like member 41 is configured of a material similar to that of the plate-like member 31, except that the plate-like member 41 is optically transparent. For example, an optically-transmissive conductive material (a transparent electrode material) such as indium tin oxide (ITO), antimony tin oxide (ATO), fluorine-doped tin oxide (FTO), and aluminum-doped zinc oxide (AZO) may be used for the counter electrode 42.

In the case in which an image is displayed on the counter substrate 40 side, the electrophoresis device 11 is viewed through the counter electrode 42. Therefore, optical transparency (transmittance) of the counter electrode 42 may be preferably as high as possible, which may be, for example, about 80% or more. In addition, electrical resistance of the counter electrode 42 may be preferably as low as possible, which may be, for example, about $100\Omega/\square$ or less.

The electrophoresis device 11 has a configuration similar to that of the electrophoresis device 11 of the above-described embodiment. Specifically, in the electrophoresis device 11, the migrating particle 10 and the porous layer 20 having the plurality of pores 23 are included in the insulating liquid 1. The insulating liquid 1 fills the space between the drive substrate 30 and the counter substrate 40, and the porous layer 20 may be supported by, for example, the spacer 60. The space filled with the insulating liquid 1 may be, for example, partitioned into a remain region R1 on a side close to the pixel electrode 35 and a display region R2 on a side close to the counter electrode 42, by the porous layer 20 serving as a border. The insulating liquid 1, the migrating particle 10, and the porous layer 20 have the respective configurations similar to those in the above-described embodiment. It is to be noted that each of FIG. 6 and FIG. 7 to be described later illustrates only part of the pores 23 to simplify the contents of illustration.

The porous layer 20 may be adjacent to either the pixel electrode 35 or the counter electrode 42, and the remain region R1 may not be partitioned clearly from the display region R2. The migrating particle 10 moves towards the pixel electrode 35 or the counter electrode 42 in response to an electric field.

The spacer 60 may have, for example, a thickness of about 10 μm to about 100 μm, and may be preferably as thin as possible. This makes it possible to suppress power consumption. The spacer 60 may be configured of, for example, an insulating material such as a polymer material, and may be provided, for example, in a grid between the drive substrate 30 and the counter substrate 40. The spacer 60 is not limited in particular in terms of arrangement shape, but may be preferably provided to distribute the migrating particles 10 uniformly, without disturbing the movement of the migrating particles 10.

In the display unit 3 in the initial state, the migrating particles 10 are arranged in the remain region R1 (FIG. 6). In this case, the migrating particles 10 are shielded in all pixels by the porous layer 20. Therefore, when being viewed from the counter substrate 40 side, the electrophoresis device 11 is in a state in which contrast is not effected (an image is not displayed).

Figure 7:
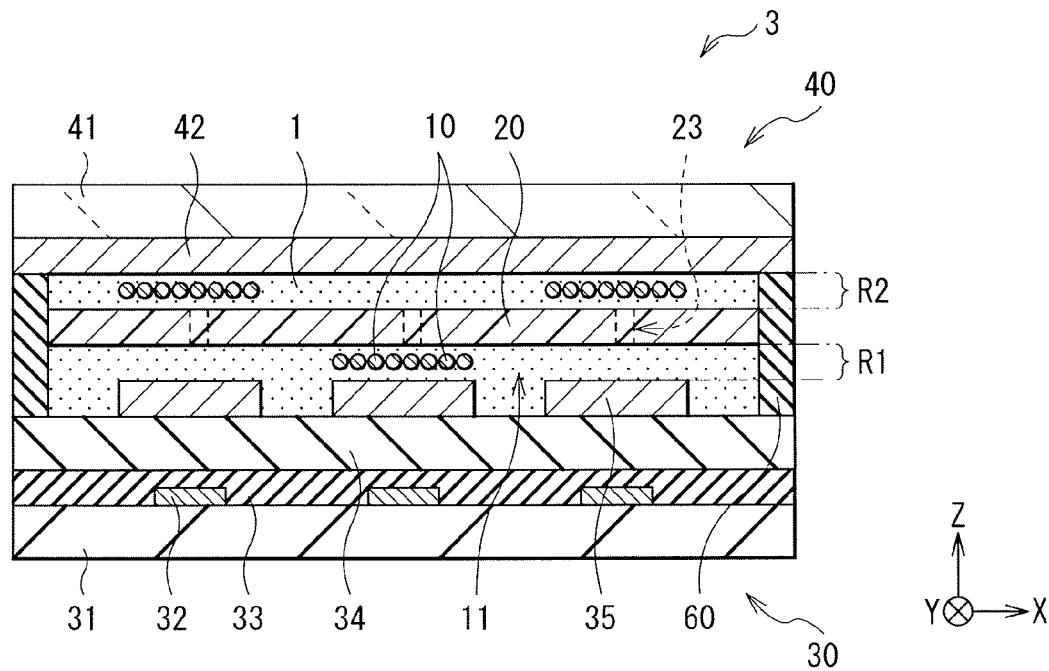
FIG. 7 is a cross-sectional diagram used to describe operation of the display unit illustrated in FIG. 6.

On the other hand, when a pixel is selected by the TFT 32, and an electric field is applied between the pixel electrode 35 and the counter electrode 42, the migrating particles 10 move from the remain region R1 to the display region R2 in each pixel via the porous layer 20 (the pore 23) as illustrated in FIG. 7. In this case, a pixel in which the migrating particles 10 are shielded by the porous layer 20 and a pixel in which the migrating particles 10 are not shielded are both present. Therefore, when viewed from the counter substrate 40 side, the electrophoresis device 11 is in a state in which contrast is effected. An image is thus displayed.

According to the display unit 3, it may be possible to display a high-quality image suitable for, for example, colorization and moving-image display, through use of the electrophoresis device 11 having superior display properties.

(Electronic Apparatus)

Next, application examples of the above-described display unit 3 will be described. The display unit 3 according to the above-described example of the present technology is applicable to electronic apparatuses for various purposes, and the type of each electronic apparatus is not limited in particular. The display unit 3 may be mounted on, for example, the following electronic apparatuses. However, a configuration of each of the electronic apparatuses to be described below is only an example and thus, the configuration thereof is modifiable as appropriate.

Application Example 1

Figure 8A:
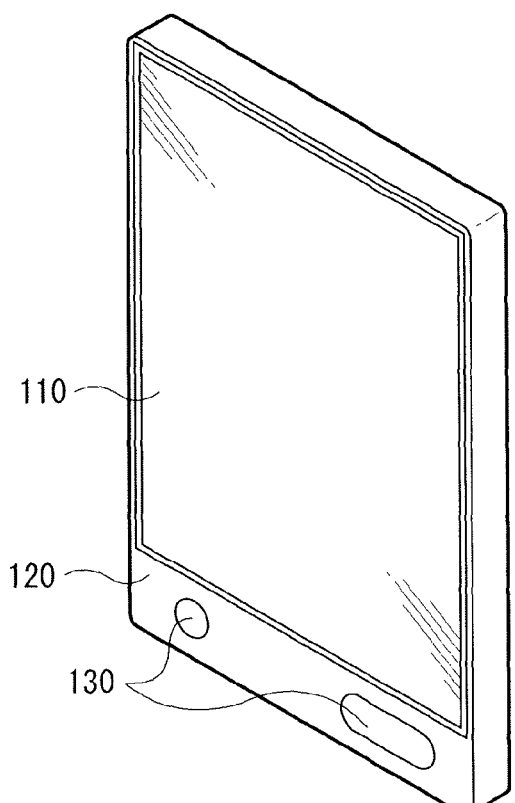
FIG. 8A is a perspective view illustrating an appearance of Application example 1.
Figure 8B:
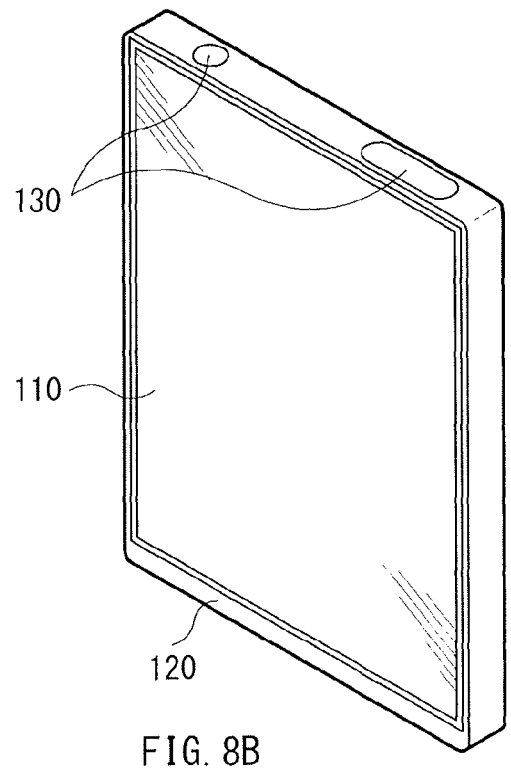
FIG. 8B is a perspective view illustrating another example of an electronic book illustrated in FIG. 8A.

FIGS. 8A and 8B each illustrate an appearance of an electronic book. This electronic book may include, for example, a display section 110, a non-display section 120, and an operation section 130. It is to be noted that the operation section 130 may be provided either on a front surface of the non-display section 120 as illustrated in FIG. 8A, or on a top surface thereof as illustrated in FIG. 8B. The display section 110 is configured using the display unit 3. It is to be noted that the display unit 3 may be mounted on a PDA (Personal Digital Assistant) having a configuration similar to that of the electronic book illustrated in FIGS. 8A and 8B.

Application Example 2

Figure 9:
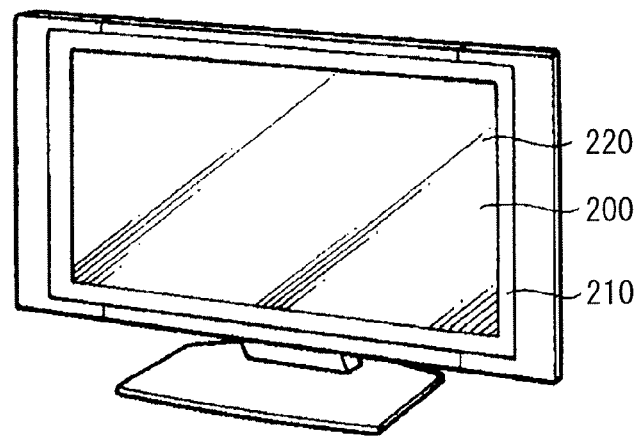
FIG. 9 is a perspective view illustrating an appearance of Application example 2.

FIG. 9 illustrates an appearance of a television receiver. This television receiver may have, for example, an image-display screen section 200 that includes a front panel 210 and a filter glass 220. The image-display screen section 200 is configured using the display unit 3.

Application Example 3

Figure 10:
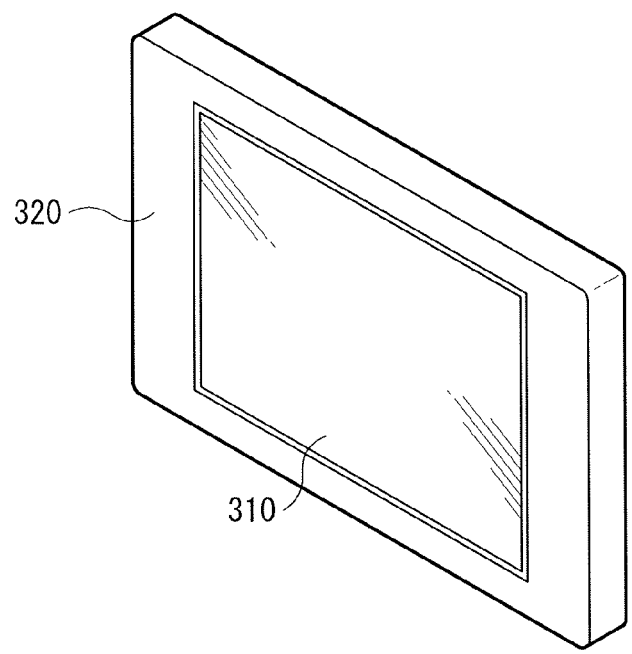
FIG. 10 is a perspective view illustrating an appearance of Application example 3.

FIG. 10 illustrates an appearance of a tablet personal computer. This tablet personal computer may include, for example, a touch panel section 310 and a housing 320. The touch panel section 310 is configured using the display unit 3.

Application Example 4

Figure 11A:
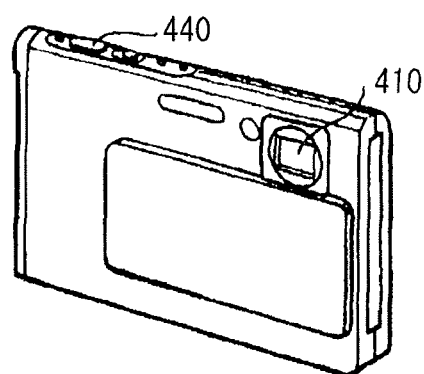
FIG. 11A is a perspective view illustrating an appearance of Application example 4 when viewed from front.
Figure 11B:
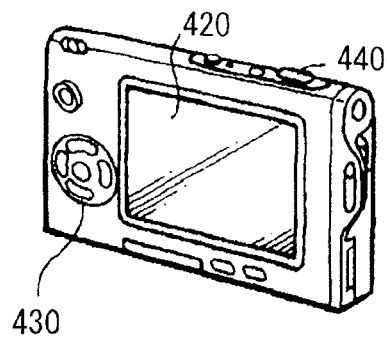
FIG. 11B is a perspective view illustrating an appearance of Application example 4 when viewed from back.

FIGS. 11A and 11B each illustrate an appearance of a digital still camera. FIG. 11A illustrates a front face, and FIG. 11B illustrates a rear face. This digital still camera may include, for example, a flash emitting section 410, a display section 420, a menu switch 430, and a shutter button 440. The display section 420 is configured using the display unit 3.

Application Example 5

Figure 12:
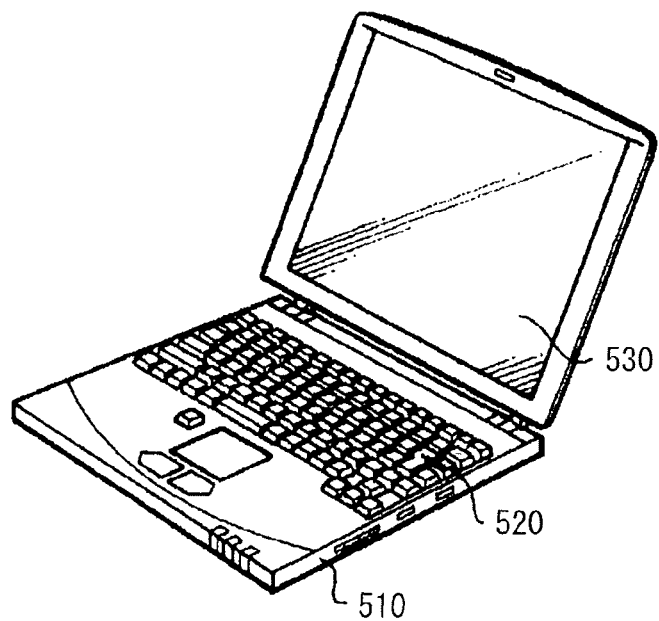
FIG. 12 is a perspective view illustrating an appearance of Application example 5.

FIG. 12 illustrates an appearance of a laptop personal computer. This laptop personal computer may include, for example, a main body section 510, a keyboard 520 provided to enter characters and the like, and a display section 530 displaying an image. The display section 530 is configured using the display unit 3.

Application Example 6

Figure 13:
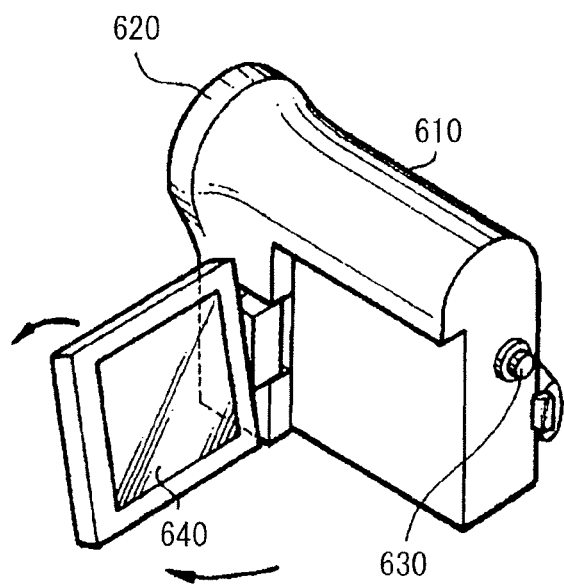
FIG. 13 is a perspective view illustrating an appearance of Application example 6.

FIG. 13 illustrates an appearance of a video camera. This video camera may include, for example, a main body section 610, a lens 620 disposed on a front face of the main body section 610 to shoot an image of a subject, a start/stop switch 630 used in shooting, and a display section 640. The display section 640 is configured using the display unit 3.

Application Example 7

Figure 14A:
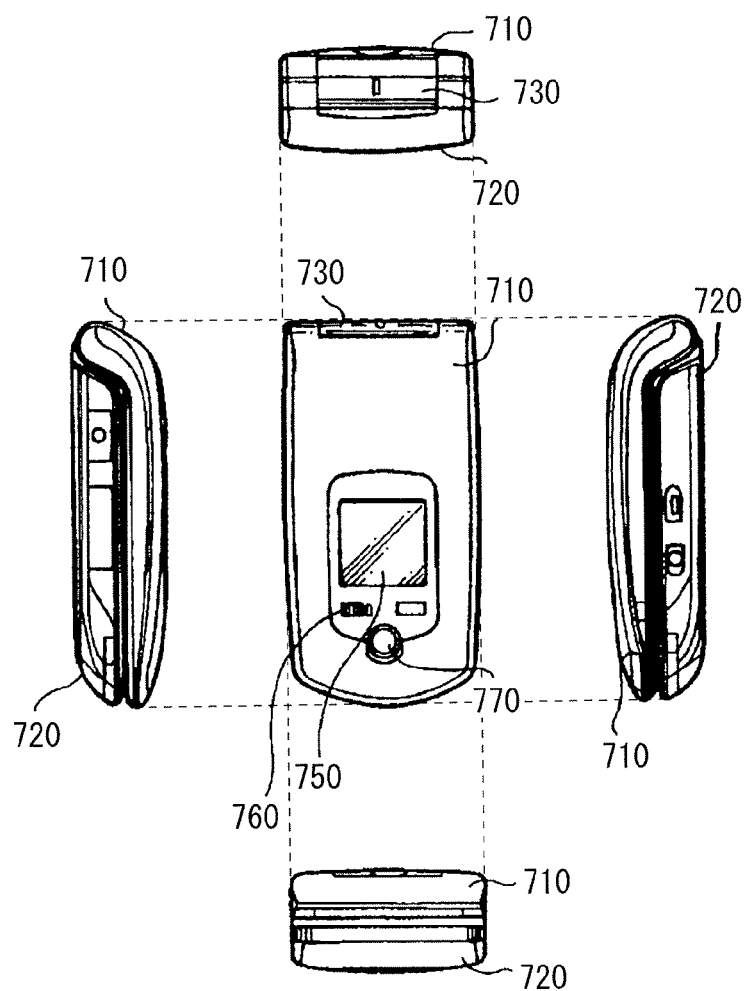
FIG. 14A is a diagram illustrating a front view, a left-side view, a right-side view, and a top view of Application example 7 in a closed state.
Figure 14B:
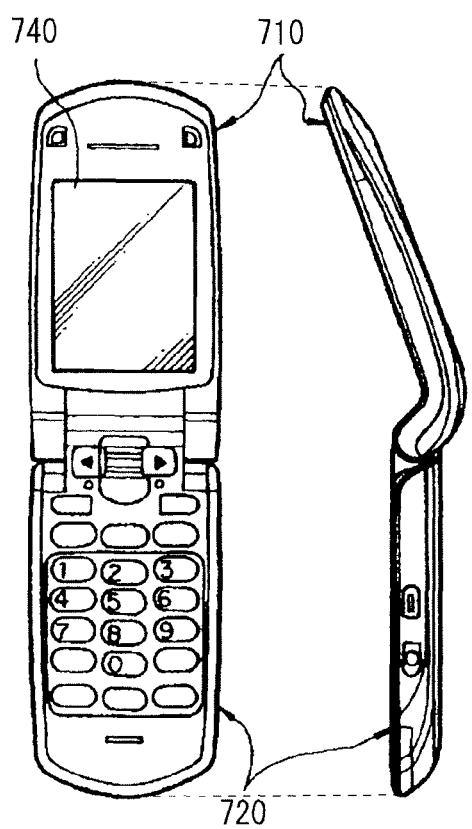
FIG. 14B is a diagram illustrating a front view and a side view of Application example 7 in an open state.

FIGS. 14A and 14B each illustrate appearances of a portable telephone. FIG. 14A illustrates a front face, a left side face, a right side face, a top face, and an undersurface of the portable telephone in a closed state. FIG. 14B illustrates a front face and a side face of the portable telephone in an open state. This portable telephone may be, for example, a unit in which an upper housing 710 and a lower housing 720 are connected by a coupling section (a hinge section) 730, and include a display 740, a sub-display 750, a picture light 760, and a camera 770.

EXAMPLES

Next, Examples of the present technology will be described.

Experimental Examples 1-1 and 2-1

A cell including a porous layer (a particle-containing fibrous structure) of white (for bright display) was prepared by the following procedure.

First, 14 g of polymethyl methacrylate was prepared as a material of a fibrous structure, and this was dissolved in 86 g of N,N'-dimethylformamide. Subsequently, to 70 g of this solution, 30 g of titanium oxide having a primary particle size of 250 nm was added as non-migrating particles, and then mixed therewith using a bead mill. As a result, spinning solution used to form the fibrous structure was obtained. Subsequently, this spinning solution was then poured into a syringe, and spinning for a thickness of 70 μm was performed on a drive substrate. A pixel electrode made of ITO and having a predetermined pattern was provided on the drive substrate. An electric-field spinning machine (NANON, available from MECC Co., Ltd.) was used for the spinning After the spinning, a porous layer (a fibrous structure holding non-migrating particles) was formed on the drive substrate by drying the drive substrate in a vacuum oven at 75° C.

After the porous layer was formed on the drive substrate, an unnecessary part of the porous layer was removed from the drive substrate. Specifically, of the porous layer, a part where the pixel electrode was not provided was removed. A counter electrode made of ITO was formed on a plate-like member, and a spacer was disposed on this counter substrate. A member obtained by drawing of a photocurable resin (photosensitive resin; Photolec A-400 (registered trademark), available from Sekisui Chemical Co., Ltd.) including beads (having an outer diameter of 30 μm) was used for the spacer, and this was provided at a position that does not overlap the porous layer when the spacer was laid on the drive substrate. After the spacer was provided on the counter substrate, this was laid on the drive substrate where the porous layer was formed. At this moment, the porous layer was spaced apart from the pixel electrode and the counter electrode by the spacer, to hold the porous layer. Subsequently, insulating liquid was injected between the drive substrate and the counter substrate. Isoparaffin (IsoparG, available from Exxon Mobil Corporation) was used for the insulating liquid, and 0.5% of methoxysulfonyloxymethane (Solsperse 17000, available from The Lubrizol Corporation) and 1.5% of Sorbitan laurate (Span 20) were added thereto as a dispersant and an electric charge modifier. Finally, the cell was completed by irradiating the photocurable resin with ultraviolet light.

Experimental Examples 1-2 and 2-2

A cell was fabricated by a procedure similar to that of the experimental examples 1-1 and 2-1 except the following. In place of the above-mentioned 30 g of titanium oxide having the primary particle size of 250 nm, mixture of 27 g of titanium oxide having a primary particle size of 250 nm (small particles) and 3 g of titanium oxide having a primary particle size of about 700 nm (large particles) was used as non-migrating particles. The percentage by weight of the small particles and that of the large particles were 90 wt % and 10 wt %, respectively.

Experimental Examples 1-3 and 2-3

A cell was fabricated by a procedure similar to that of the experimental examples 1-1 and 2-1 except the following. In place of the above-mentioned 30 g of titanium oxide having the primary particle size of 250 nm, mixture of 24 g of titanium oxide having a primary particle size of 250 nm (small particles) and 6 g of titanium oxide having a primary particle size of 700 nm (large particles) was used as non-migrating particles. The percentage by weight of the small particles and that of the large particles were 80 wt % and 20 wt %, respectively.

Experimental Examples 1-4 and 2-4

A cell was fabricated by a procedure similar to that of the experimental examples 1-1 and 2-1 except the following. In place of the above-mentioned 30 g of titanium oxide having the primary particle size of 250 nm, mixture of 21 g of titanium oxide having a primary particle size of 250 nm (small particles) and 9 g of titanium oxide having a primary particle size of 700 nm (large particles) was used as non-migrating particles. The percentage by weight of the small particles and that of the large particles were 70 wt % and 30 wt %, respectively.

Experimental Examples 1-5 and 2-5

A cell was fabricated by a procedure similar to that of the experimental examples 1-1 and 2-1 except the following. In place of the above-mentioned 30 g of titanium oxide having the primary particle size of 250 nm, mixture of 18 g of titanium oxide having a primary particle size of 250 nm (small particles) and 12 g of titanium oxide having a primary particle size of 700 nm (large particles) was used as non-migrating particles. The percentage by weight of the small particles and that of the large particles were 60 wt % and 40 wt %, respectively.

Experimental Examples 1-6, 2-6

A cell was fabricated by a procedure similar to that of the experimental examples 1-1 and 2-1 except the following. In place of the above-mentioned 30 g of titanium oxide having the primary particle size of 250 nm, mixture of 15 g of titanium oxide having a primary particle size of 250 nm (small particles) and 15 g of titanium oxide having a primary particle size of 700 nm (large particles) was used as non-migrating particles. The percentage by weight of the small particles and that of the large particles were 50 wt % and 50 wt %, respectively.

Experimental Examples 1-1 to 1-6

Results of measuring optical transmittance of the cells in each of the experimental examples 1-1 to 1-6 are presented in Table 1. In the measurement, optical transmittance in a wavelength range of 200 nm to 1,000 nm was determined using a F20-UV available from Filmetrics, Inc. Table 1 presents values of optical transmittance at 400 nm.

TABLE 1

| Experimental Examples | Particle Size (nm) | | Ratio (wt %) | | Optical Transmittance (%) |
| --- | --- | --- | --- | --- | --- |
| | Small Particles | Large Particles | Small Particles | Large Particles | |
| 1-1 | 250 | 700 | 100 | 0 | 0.14 |
| 1-2 | | | 90 | 10 | 0.11 |
| 1-3 | | | 80 | 20 | 0.07 |
| 1-4 | | | 70 | 30 | 0.02 |
| 1-5 | | | 60 | 40 | 0 |
| 1-6 | | | 50 | 50 | — |

As apparent from Table 1, the optical transmittance of the cell of the experimental example 1-1 containing no large particle (a particle size of 700 nm) is 0.14%, whereas the optical transmittance gradually decreases as the percentage by weight of the large particles increases to 10 wt %, 20 wt %, 30 wt %, and 40 wt % (the experimental examples 1-2 to 1-5). This decrease in the optical transmittance means that inclusion of large particles increases an area occupied by non-migrating particles in insulating liquid, thereby allowing migrating particles to be hidden efficiently. It is to be noted that, for the cell in which the percentage by weight of the large particles was 50 wt % or more (the experimental example 1-6), fiberization (spinning) was difficult because of an increase in the volume of the non-migrating particles, and therefore, measurement of optical transmittance was not achievable.

Experimental Examples 2-1 to 2-6

Results of measuring optical reflectance of the cell in each of the above-described experimental examples 2-1 to 2-6 are presented in Table 2. In the measurement, optical reflectance in a substrate normal direction with respect to a standard diffuser was measured with a ring light at 45 degrees to 0 degrees, through use of a spectrophotometer (eye-one pro, available from X-Rite, Inc.).

TABLE 2

| Experimental Examples | Particle Size (nm) | | Ratio (wt %) | | Optical Reflectance (%) |
| --- | --- | --- | --- | --- | --- |
| | Small Particles | Large Particles | Small Particles | Large Particles | |
| 2-1 | 250 | 700 | 100 | 0 | 45 |
| 2-2 | | | 90 | 10 | 48 |
| 2-3 | | | 80 | 20 | 50 |
| 2-4 | | | 70 | 30 | 51 |
| 2-5 | | | 60 | 40 | 50 |
| 2-6 | | | 50 | 50 | — |

It was confirmed from Table 2 that high optical reflectance was maintained in the porous layer even in a case where the percentage by weight of the large particles increased to 40 wt % (the experimental examples 2-1 and 2-5). In other words, even if large particles are included in non-migrating particles, light scattering efficiency does not fall, and it is possible to keep optical properties of the non-migrating particles. It is to be noted that, for the cell in which the percentage by weight of the large particles was 50 wt % or more (the experimental example 2-6), fiberization (spinning) was difficult because of an increase in the volume of the non-migrating particles, and therefore, measurement of optical reflectance was not achievable.

Experimental Example 3-1

A display unit was fabricated using black migrating particles (for dark display) and a white porous layer (for bright display) by the following procedure.

First, 42.624 g of sodium hydroxide and 0.369 g of sodium silicate were dissolved in 43 g of water. Subsequently, while this solution was stirred, 5 g of complex oxide fine particles (copper-iron-manganese oxide: DAIPYROXIDE Color TM3550, available from Dainichiseika Color & Chemicals Mfg. Co., Ltd.) were added to the solution. This was then stirred for 15 minutes, which was followed by supersonic wave stirring (at 30° C. to 35° C., for 15 minutes). This dispersion liquid of complex oxide fine particles was then heated at 90° C. Subsequently, 15 cm$^3$ (mL) of sulfuric acid of 0.22 mol/cm$^3$ and 7.5 cm$^3$ of water solution in which 6.5 mg of sodium silicate and 1.3 mg of sodium hydroxide were dissolved were dripped into the dispersion liquid for two hours. Subsequently, this was cooled to room temperature, and then about 1.8 cm$^3$ of sulfuric acid of 1 mol/cm$^3$ was added thereto, which was followed by centrifugal separation (at 3700 rpm, for 30 minutes) and decantation. Next, sediment resulting from this decantation was dispersed again in ethanol, which was followed by centrifugal separation (at 3500 rpm, for 30 minutes) and decantation. Sediment obtained by repeating this cleaning process twice was put in a bottle. Mixed solution of 5 cm$^3$ of ethanol and 0.5 cm$^3$ of water was added to this bottle, which was followed by supersonic wave stirring (for 1 hour). As result, a dispersion solution of silane-coated complex oxide particles was obtained.

Next, solution was obtained by mixing 3 cm$^3$ of water, 30 cm$^3$ of ethanol, and 4 g of N-[3-(trimethoxysilyl)propyl]-N'-(4-vinylbenzyl)ethylenediamine hydrochloride (40% methanol solution) and stirring the mixture for 7 minutes. To this solution, the whole quantity of the above-described dispersion solution of silane-coated complex oxide particles was added. Subsequently, this mixed solution was stirred for 10 minutes, and then subjected to centrifugal separation (at 3500 rpm, for 30 minutes) and decantation. Next, sediment resulting from this decantation was dispersed again in ethanol, and centrifugal separation (at 3500 rpm, for 30 minutes) and decantation were performed thereon. Sediment obtained by repeating this cleaning operation twice was dried for 6 hours in a decompression environment at room temperature, and further dried for 2 hours in a decompression environment at 70° C. As a result, a solid was obtained.

Next, 50 cm$^3$ of toluene was added to this solid, and this was stirred for 12 hours with a roll mill. This was then moved into a three neck flask, and 1.7 g of 2-ethylhexyl acrylate was added thereto, which was then stirred in a nitrogen gas stream for 20 minutes. Next, the mixed solution was stirred at 50° C. for 20 minutes, and then 3 cm$^3$ of toluene solution including 0.01 g of AIBN was added thereto, which was then heated at 65° C. Subsequently, after being stirred for 1 hour, this mixed solution was cooled to room temperature, and then was poured into a bottle together with ethyl acetate. This bottle was then subjected to centrifugal separation (at 3500 rpm, for 30 minutes), and decantation was performed thereon. Subsequently, sediment resulting from this decantation was dispersed again in ethyl acetate, and centrifugal separation (at 3500 rpm, for 30 minutes) and decantation were performed thereon. This cleaning operation using ethyl acetate was repeated three times, and the obtained sediment was dried for 12 hours in a decompression environment at room temperature, and further dried for about 2 hours in a decompression environment at 70° C. As a result of the above-described process, black migrating particles made of a polymer-coated pigment were obtained.

After the migrating particles were prepared, insulating liquid that contains 0.5% of methoxysulfonyloxymethane (Solsperse 17000, available from The Lubrizol Corporation) and 1.5% of Sorbitan laurate (Span 20) as a dispersant and an electric charge modifier was prepared. Isoparaffin (IsoparG, available from Exxon Mobil Corporation) was used as the insulating liquid. the above-described migrating particles 0.1 g was added to 9.9 g of this solution, and this solution was then stirred for 5 minutes with a bead mill. Subsequently, zirconia beads (0.03 mm in diameter) were added to the solution, and this solution was then stirred with a homogenizer for 4 hours. Subsequently, the zirconia beads were removed, and an average particle size of the migrating particles was measured, which was 100 nm. A zeta-potential & particle size analyzer ELSZ-2 (a product available from Otsuka Electronics Co., Ltd.), was used for the measurement of the average particle size.

Meanwhile, the porous layer was fabricated by a procedure similar to that of the above-described experimental examples 1-1 and 2-1. Finally, instead of injecting only the insulating liquid between the drive substrate and the counter substrate in the cell in the experimental examples 1-1 and 2-1, the insulating liquid in which the above-described migrating particles were dispersed was injected therebetween, which completed the display unit.

Experimental Example 3-2

A display unit was fabricated by a procedure similar to that of the experimental example 3-1 except the following. In place of 30 g of titanium oxide having a primary particle size of 250 nm, a mixture of 27 g of titanium oxide having a primary particle size of 250 nm (small particles) and 3 g of titanium oxide having a primary particle size of 700 nm (large particles) was used as non-migrating particles. The percentage by weight of the small particles and that of the large particles were 90 wt % and 10 wt %, respectively.

Experimental Example 3-3

A display unit was fabricated by a procedure similar to that of the experimental example 3-1 except the following. In place of the 30 g of titanium oxide having the primary particle size of 250 nm, a mixture of 24 g of titanium oxide having a primary particle size of 250 nm (small particles) and 6 g of titanium oxide having a primary particle size of 700 nm (large particles) was used as non-migrating particles. The percentage by weight of the small particles and that of the large particles were 80 wt % and 20 wt %, respectively.

Experimental Example 3-4

A display unit was fabricated by a procedure similar to that of the experimental example 3-1 except the following. In place of the 30 g of titanium oxide having the primary particle size of 250 nm, a mixture of 21 g of titanium oxide having a primary particle size of 250 nm (small particles) and 9 g of titanium oxide having a primary particle size of 700 nm (large particles) was used as non-migrating particles. The percentage by weight of the small particles and that of the large particles were 70 wt % and 30 wt %, respectively.

Experimental Example 3-5

A display unit was fabricated by a procedure similar to that of the experimental example 3-1 except the following. In place of the 30 g of titanium oxide having the primary particle size of 250 nm, a mixture of 18 g of titanium oxide having a primary particle size of 250 nm (small particles) and 12 g of titanium oxide having a primary particle size of 700 nm (large particles) was used as non-migrating particles. The percentage by weight of the small particles and that of the large particles were 60 wt % and 40 wt %, respectively.

Experimental Example 3-6

A display unit was fabricated by a procedure similar to that of the experimental example 3-1 except the following. In place of the 30 g of titanium oxide having the primary particle size of 250 nm, 30 g of titanium oxide having a primary particle size of 700 nm (large particles) was used as non-migrating particles.

Experimental Example 3-7

A display unit was fabricated by a procedure similar to that of the experimental example 3-1 except the following. In place of the 30 g of titanium oxide having the primary particle size of 250 nm, a mixture of 27 g of titanium oxide having a primary particle size of 250 nm (small particles) and 3 g of titanium oxide having a primary particle size of 400 nm (large particles) was used as non-migrating particles. The percentage by weight of the small particles and that of the large particles were 90 wt % and 10 wt %, respectively.

Experimental Example 3-8

A display unit was fabricated by a procedure similar to that of the experimental example 3-1 except the following. In place of the 30 g of titanium oxide having the primary particle size of 250 nm, a mixture of 24 g of titanium oxide having a primary particle size of 250 nm (small particles) and 6 g of titanium oxide having a primary particle size of 400 nm (large particles) was used as non-migrating particles. The percentage by weight of the small particles and that of the large particles were 80 wt % and 20 wt %, respectively.

Experimental Example 3-9

A display unit was fabricated by a procedure similar to that of the experimental example 3-1 except the following. In place of the 30 g of titanium oxide having the primary particle size of 250 nm, a mixture of 21 g of titanium oxide having a primary particle size of 250 nm (small particles) and 9 g of titanium oxide having a primary particle size of 400 nm (large particles) was used as non-migrating particles. The percentage by weight of the small particles and that of the large particles were 70 wt % and 30 wt %, respectively.

Experimental Example 3-10

A display unit was fabricated by a procedure similar to that of the experimental example 3-1 except the following. In place of the 30 g of titanium oxide having the primary particle size of 250 nm, a mixture of 18 g of titanium oxide having a primary particle size of 250 nm (small particles) and 12 g of titanium oxide having a primary particle size of 400 nm (large particles) was used as non-migrating particles. The percentage by weight of the small particles and that of the large particles were 60 wt % and 40 wt %, respectively.

Experimental Example 3-11

A display unit was fabricated by a procedure similar to that of the experimental example 3-1 except that, in place of the 30 g of titanium oxide having the primary particle size of 250 nm, 30 g of titanium oxide having a primary particle size of 400 nm was used as non-migrating particles.

Experimental Example 3-12

A display unit was fabricated by a procedure similar to that of the experimental example 3-1 except that, in place of the 30 g of titanium oxide having the primary particle size of 250 nm, 30 g of titanium oxide having a primary particle size of 200 nm was used as non-migrating particles.

Experimental Example 3-13

A display unit was fabricated by a procedure similar to that of the experimental example 3-1 except the following. In place of the 30 g of titanium oxide having the primary particle size of 250 nm, a mixture of 27 g of titanium oxide having a primary particle size of 200 nm (small particles) and 3 g of titanium oxide having a primary particle size of 700 nm (large particles) was used as non-migrating particles. The percentage by weight of the small particles and that of the large particles were 90 wt % and 10 wt %, respectively.

Experimental Example 3-14

A display unit was fabricated by a procedure similar to that of the experimental example 3-1 except the following. In place of the 30 g of titanium oxide having the primary particle size of 250 nm, a mixture of 24 g of titanium oxide having a primary particle size of 200 nm (small particles) and 6 g of titanium oxide having a primary particle size of 700 nm (large particles) was used as non-migrating particles. The percentage by weight of the small particles and that of the large particles were 80 wt % and 20 wt %, respectively.

Experimental Example 3-15

A display unit was fabricated by a procedure similar to that of the experimental example 3-1 except the following. In place of the 30 g of titanium oxide having the primary particle size of 250 nm, a mixture of 21 g of titanium oxide having a primary particle size of 200 nm (small particles) and 9 g of titanium oxide having a primary particle size of 700 nm (large particles) was used as non-migrating particles. The percentage by weight of the small particles and that of the large particles were 70 wt % and 30 wt %, respectively.

Experimental Example 3-16

A display unit was fabricated by a procedure similar to that of the experimental example 3-1 except the following. In place of the 30 g of titanium oxide having the primary particle size of 250 nm, a mixture of 18 g of titanium oxide having a primary particle size of 200 nm (small particles) and 12 g of titanium oxide having a primary particle size of 700 nm (large particles) was used as non-migrating particles. The percentage by weight of the small particles and that of the large particles were 60 wt % and 40 wt %, respectively.

Experimental Example 3-17

A display unit was fabricated by a procedure similar to that of the experimental example 3-1 except the following. In place of the 30 g of titanium oxide having the primary particle size of 250 nm, a mixture of 15 g of titanium oxide having a primary particle size of 200 nm (small particles) and 15 g of titanium oxide having a primary particle size of 700 nm (large particles) was used as non-migrating particles. The percentage by weight of the small particles and that of the large particles were both 50 wt %.

Experimental Examples 3-1 to 3-17

Optical reflectance (white reflectance and black reflectance) and response time at the time of each of bright display and dark display were measured as performance of the display unit of each of these experimental examples 1-3 to 3-17. Results thereof are presented in Table 3.

The white reflectance and the black reflectance were measured as follows. After an AC voltage (0.1 Hz and 15 V) was applied to the display unit for 1 hour, optical reflectance in a substrate normal direction with respect to a standard diffuser was measured with a ring light at 45 degrees to 0 degrees, through use of a spectrophotometer (eye-one pro, available from X-Rite, Inc.).

The response time was calculated from the time taken by a change in luminance, assuming that luminance when bright display was performed was "1" and luminance when dark display was performed was "0". Specifically, a value, which is an average of the time taken by a change in luminance from 0.1 to 0.9 during an application of a rectangular wave electric field (15 V) to the display unit, and the time taken by a change in luminance from 0.9 to 0.1 after a halt of the application of the electric field, was assumed to be the response time. A function generator (a product available from TOYO Corporation) was used to measure the response time.

TABLE 3

| Experimental Examples | Particle Size (nm) | | Ratio (wt %) | | Optical Reflectance (%) | | Response Speed (ms) |
|---|---|---|---|---|---|---|---|
| | Small Particles | Large Particles | Small Particles | Large Particles | White | Black | |
| 3-1 | 250 | 700 | 100 | 0 | 28 | 2.5 | 200 |
| 3-2 | | | 90 | 10 | 39 | 2.5 | |
| 3-3 | | | 80 | 20 | 40 | 2.5 | |
| 3-4 | | | 70 | 30 | 40 | 3 | |
| 3-5 | | | 60 | 40 | 25 | 13 | — |
| 3-6 | | | 0 | 100 | 16 | 15 | |
| 3-7 | | 400 | 90 | 10 | 40 | 2.5 | 200 |
| 3-8 | | | 80 | 20 | 40 | 2.5 | |
| 3-9 | | | 70 | 30 | 36 | 3 | |
| 3-10 | | | 60 | 40 | 24 | 14 | — |

TABLE 3-continued

| Experimental Examples | Particle Size (nm) | | Ratio (wt %) | | Optical Reflectance (%) | | Response Speed (ms) |
|---|---|---|---|---|---|---|---|
| | Small Particles | Large Particles | Small Particles | Large Particles | White | Black | |
| 3-11 | | | 0 | 100 | 17 | 17 | |
| 3-12 | 200 | 700 | 100 | 0 | 25 | 3 | 200 |
| 3-13 | | | 90 | 10 | 37 | 3 | |
| 3-14 | | | 80 | 20 | 39 | 3 | |
| 3-15 | | | 70 | 30 | 39 | 3 | |
| 3-16 | | | 60 | 40 | 23 | 14 | — |
| 3-17 | | | 50 | 50 | 18 | 15 | |

It is found that when the experimental examples 3-2 to 3-4 are compared with the experimental example 3-1, the white reflectance (the reflectance at the time of bright display) is considerably improved by including the large particles in the non-migrating particles. In other words, it is possible to confirm that the large particles hide migrating particles effectively. Further, at this moment, the black reflectance (reflectance at the time of dark display) and the response speed are each maintained at about the same level as that in the case in which the non-migrating particles are configured of only the small particles (the experimental example 3-1). The same is true for the cases in which the particle size of the large particles is 400 nm (the experimental examples 3-7 to 3-9) and the cases in which the particle size of the small particles is 200 nm (the experimental examples 3-12 to 3-15). In the experimental example 3-4, the black reflectance is reduced, and in the experimental example 3-9, the white reflectance and the black reflectance are reduced. It may be expected that this is because dispersibility of the non-migrating particles declines as the proportion of the large particles increases as compared with the small particles. Therefore, preferably, the percentage by weight of the large particles may be suppressed to the extent that the dispersibility of the non-migrating particles in the electrophoresis device does not decrease.

It is to be noted that, in the experimental examples 3-5, 3-6, 3-10, 3-11, 3-16, and 3-17, the volume of the non-migrating particles increases and thus, fiberization (spinning) is difficult, and the white reflectance and the black reflectance decrease. For these experimental examples 3-5, 3-6, 3-10, 3-11, 3-16, and 3-17, a response speed was not measurable.

The present technology has been described above with reference to the embodiment and Examples, but is not limited thereto and may be variously modified. For example, in the above-described embodiment and the like, the case in which the non-migrating particles 22 include the large particles 22L and the small particles 22S has been described, but the migrating particles 10 may include large particles and small particles.

Further, in the above-described embodiment and the like, the case in which one type of the particles having different optical reflectance from each other is the non-migrating particle 22 has been described, but both types of the particles may migrate.

Furthermore, the electrophoresis device according to an embodiment of the present technology may be applied not only to a display unit, but also to other types of electronic apparatuses.

It is possible to achieve at least the following configurations from the above-described example embodiments and the modifications of the disclosure.

(1) An electrophoretic display device comprising:
a plurality of first particles configured to migrate between a remain region and a display region in response to an electric field; and
a plurality of non-migrating second particles fixedly disposed between the remain and display regions and configured to (a) allow the plurality of first particles to pass between the remain and display regions in response to the electric field, and (b) cover the plurality of first particles when the first particles are disposed in the remain region.

(2) The display device of (1) wherein the non-migrating second particles include particles of a first primary particle size and particles of a second primary particle size.

(3) The display device of (2) wherein the particles of the first primary particle size are larger than the particles of the second primary particle size and configured to cover the plurality of the first particles when the first particles are disposed in the remain region.

(4) The display device of (3) wherein the particles of the second primary particle size are smaller than the particles of the first primary particle size and configured to allow the plurality of first particles to pass through the plurality of non-migrating second particles.

(5) The display device of claim 4) further comprising:
a drive substrate;
a counter substrate opposite the drive substrate; and
a porous layer disposed between the drive substrate and the counter substrate, the porous layer including the plurality of non-migrating second particles.

(6) The display device of (5) wherein the plurality of first particles and the porous layer are disposed in an insulating liquid filling a space between the drive substrate and the counter substrate.

(7) The display device of (6) wherein the porous layer partitions the insulating liquid into the remain region on a side adjacent to the drive substrate and the display region on a side adjacent to the counter substrate.

(8) The display device of (7) wherein the drive substrate includes a transistor, a protective layer, a planarizing insulating layer, and a pixel electrode on a surface of a plate-like member.

(9) The display device of (8) wherein the plate-like member is flexible.

(10) The display device of (9) wherein the counter substrate includes a plate-like member and a counter electrode provided on an entire surface of the plate-like member that faces the drive substrate.

(11) The display device of (10) wherein the plurality of first particles and the plurality of non-migrating second particles have different respective optical reflectances.

(12) The display device of (11) wherein the first primary particle size is approximately 700 nm and the second primary particle size is approximately 250 nm.

(13) A display apparatus comprising:
a display section including an electrophoretic display unit, the display unit comprising
  a plurality of first particles configured to migrate between a remain region and a display region in response to an electric field; and
  a plurality of non-migrating second particles fixedly disposed between the remain and display regions and configured to (a) allow the plurality of first particles to pass between the remain and display regions in response to the electric field, and (b) cover the plurality of first particles when the first particles are disposed in the remain region.

(14) The display apparatus of (13) wherein the non-migrating second particles include particles of a first primary particle size and particles of a second primary particle size.

(15) The display apparatus of (14) wherein the particles of the first primary particle size are larger than the particles of the second primary particle size and configured to cover the plurality of the first particles when the first particles are disposed in the remain region.

(16) The display apparatus of (15) wherein the particles of the second primary particle size are smaller than the particles of the first primary particle size and configured to allow the plurality of first particles to pass through the plurality of non-migrating second particles.

(17) The display apparatus of (16) further comprising:
a drive substrate;
a counter substrate opposite the drive substrate; and
a porous layer disposed between the drive substrate and the counter substrate, the porous layer including the plurality of non-migrating second particles.

(18) The display apparatus of (17) wherein the plurality of first particles and the porous layer are disposed in an insulating liquid filling a space between the drive substrate and the counter substrate.

(19) The display apparatus of (18) wherein the porous layer partitions the insulating liquid into the remain region on a side adjacent to the drive substrate and the display region on a side adjacent to the counter substrate.

(20) The display apparatus of (19) wherein (a) the first primary particle size is approximately 700 nm and the second primary particle size is approximately 250 nm, and (b) the plurality of first particles and the plurality of non-migrating second particles have different respective optical reflectances.

(21) A display unit including:
first particles included in an insulating liquid, the first particles being movable in an electric field; and
second particles included in the insulating liquid, the second particles having optical reflectance different from optical reflectance of the first particles, the second particles including one or more large particles and one or more small particles, and the one or more large particles having a primary particle size that is different from a primary particle size of the one or more small particles.

(22) The display unit according to (21), wherein the primary particle size of the one or more large particles is about 400 nanometers or more.

(23) The display unit according to (21) or (22), wherein the second particles are each a non-migrating particle held in a fibrous structure.

(24) The display unit according to any one of (21) to (23), wherein the primary particle size of the large particles is about 1,000 nanometers or less.

(25) The display unit according to any one of (21) to (24), wherein the primary particle size of the large particles is about 700 nanometers or less.

(26) The display unit according to any one of (21) to (25), wherein the primary particle size of the small particles is less than about 400 nanometers.

(27) The display unit according to any one of (21) to (26), wherein the primary particle size of the small particles is about 200 nanometers or more.

(28) The display unit according to (23), wherein
the optical reflectance of the second particles is higher than the optical reflectance of the first particles, and
the first particles perform dark display and the second particles and the fibrous structure perform bright display.

(29) The display unit according to (23), wherein a fiber diameter of the fibrous structure is about 50 nanometers or more and about 2,000 nanometers or less.

(30) The display unit according to (23), wherein an average pore size of the fibrous structure is about 0.1 micrometers or more and about 10 micrometers or less.

(31) The display unit according to (23), wherein the fibrous structure is formed by an electrostatic spinning method.

(32) The display unit according to any one of (21) to (31), wherein the second particles are configured of one or more of organic pigment, inorganic pigment, dye, carbon material, metallic material, metal oxide, glass, and polymer material.

(33) An electronic apparatus with a display unit, the display unit including:
first particles included in an insulating liquid, the first particles being movable in an electric field; and
second particles included in the insulating liquid, the second particles having optical reflectance different from optical reflectance of the first particles, the second particles including one or more large particles and one or more small particles, and the one or more large particles having a primary particle size that is different from a primary particle size of the one or more small particles.

It should be understood by those skilled in the art that various modifications, combinations, sub-combinations and alterations may occur depending on design requirements and other factors insofar as they are within the scope of the appended claims or the equivalents thereof.

What is claimed is:
1. An electrophoretic display device comprising:
a display region and another region separated by a porous layer;
a plurality of first particles which migrate through the porous layer and between the another region and the display region in response to an electric field; and
a plurality of non-migrating second particles which are fixedly disposed in the porous layer and which allow the plurality of first particles to pass through the porous layer in response to the electric field, and which cover the plurality of first particles when the first particles are disposed in the another region,
wherein,
the non-migrating second particles include particles of a first primary particle size and particles of a second primary particle size, wherein a weight percentage of the particles of the second primary particle size, in the non-migrating second particles, is greater than a weight per- centage of the particles of the first primary particle size, in the non-migrating second particles, the particles of the first primary particle size are larger than the particles of the second primary particle size and cover the plurality of the first particles when the first particles are disposed in the another region, and the particles of the second primary particle size are smaller than the particles of the first primary particle size and allow the plurality of first particles to pass through the plurality of non-migrating second particles.

2. The display device of claim 1 wherein the porous layer is a fibrous structure.

3. The display device of claim 2 wherein the weight percentage of the particles of the first primary particle size out of all of the non-migrating second particles is less than 40 wt %.

4. The display device of claim 2 wherein the first primary particle size is approximately 700 nm and the second primary particle size is approximately 250 nm.

5. The display device of claim 1 further comprising:
a drive substrate; and
a counter substrate opposite the drive substrate,
wherein the porous layer is disposed between the drive substrate and the counter substrate.

6. The display device of claim 5 further comprising an insulating liquid filling a space between the drive substrate and the counter substrate, wherein the plurality of first particles and the porous layer are disposed in the insulating liquid.

7. The display device of claim 6 wherein the porous layer partitions the insulating liquid into the another region on a side adjacent to the drive substrate and the display region on a side adjacent to the counter substrate.

8. The display device of claim 5 wherein the drive substrate includes a transistor, a protective layer, a planarizing insulating layer, and a pixel electrode on a surface of a plate-like member.

9. The display device of claim 8 wherein the plate-like member is flexible.

10. The display device of claim 5 wherein the counter substrate includes a plate-like member and a counter electrode provided on an entire surface of the plate-like member that faces the drive substrate.

11. The display device of claim 1 wherein the plurality of first particles and the plurality of non-migrating second particles have different respective optical reflectances.

12. A display apparatus comprising a display section including an electrophoretic display unit, the display unit comprising:
a display region and another region separated by a porous layer;
a plurality of first particles which migrate through the porous layer and between the another region and the display region in response to an electric field; and a plurality of non-migrating second particles which are fixedly disposed in the porous layer and which allow the plurality of first particles to pass through the porous layer in response to the electric field, and which cover the plurality of first particles when the first particles are disposed in the another region, wherein, the non-migrating second particles include particles of a first primary particle size and particles of a second primary particle size, wherein a weight percentage of the particles of the second primary particle size, in the non-migrating second particles, is greater than a weight percentage of the particles of the first primary particle size, in the non-migrating second particles, the particles of the first primary particle size are larger than the particles of the second primary particle size and cover the plurality of the first particles when the first particles are disposed in the another region, and the particles of the second primary particle size are smaller than the particles of the first primary particle size and allow the plurality of first particles to pass through the plurality of non-migrating second particles.

13. The display apparatus of claim 12 wherein the porous layer is a fibrous structure.

14. The display apparatus of claim 13 wherein (a) the first primary particle size is approximately 700 nm and the second primary particle size is approximately 250 nm, and (b) the plurality of first particles and the plurality of non-migrating second particles have different respective optical reflectances.

15. The display apparatus of claim 13 wherein the weight percentage of the particles of the first primary particle size out of all of the non-migrating second particles is less than 40 wt %.

16. The display apparatus of claim 12 further comprising:
a drive substrate; and
a counter substrate opposite the drive substrate,
wherein the porous layer is disposed between the drive substrate and the counter substrate.

17. The display apparatus of claim 16 further comprising an insulating liquid filling a space between the drive substrate and the counter substrate, wherein the plurality of first particles and the porous layer are disposed in the insulating liquid.

18. The display apparatus of claim 17 wherein the porous layer partitions the insulating liquid into the another region on a side adjacent to the drive substrate and the display region on a side adjacent to the counter substrate.

* * * * *